Oct. 24, 1967 H. J. STIRLING ETAL 3,349,188

INCOMING JUNCTION SCANNING ARRANGEMENT IN AUTOMATIC TELEPHONE EXCHANGE SYSTEM

Filed March 26, 1964 20 Sheets-Sheet 2

Oct. 24, 1967 H. J. STIRLING ETAL 3,349,188

INCOMING JUNCTION SCANNING ARRANGEMENT IN AUTOMATIC TELEPHONE EXCHANGE SYSTEM

Filed March 26, 1964 20 Sheets-Sheet 4

Oct. 24, 1967 H. J. STIRLING ETAL 3,349,188

INCOMING JUNCTION SCANNING ARRANGEMENT IN AUTOMATIC TELEPHONE EXCHANGE SYSTEM

Filed March 26, 1964 20 Sheets-Sheet 6

DESCRIPTION

TRANSISTOR PULSE-PLUS-BIAS GATE
(NUMERAL INDICATES NUMBER OF INPUTS)

TRANSISTOR "AND" GATE
(NUMERAL INDICATES NUMBER OF INPUTS)

TRANSISTOR "OR" GATE

TRANSISTOR "AND" GATE WITH EMITTER GATING
(NUMERAL INDICATES NUMBER OF INPUTS IN THE BASE CIRCUIT)

TRANSISTOR BISTABLE CIRCUIT
WITH ASSOCIATED PULSE PLUS-BIAS GATES

TRANSISTOR MONOSTABLE CIRCUIT WITH ASSOCIATED
PULSE PLUS-BIAS GATE
QUASISTABLE PERIOD INDICATED IN RIGHT HAND RECTANGLE

INVERTER

AMPLIFIER

AMPLIFIER WITH CLAMPING INPUT

TRANSISTOR OSCILLATOR WITH AND WITHOUT
INHIBITING INPUT (WAVE FORM OF OUTPUT
INDICATED WITHIN RECTANGLE)

Fig. 7(R)

United States Patent Office 3,349,188

Patented Oct. 24, 1967

3,349,188

INCOMING JUNCTION SCANNING ARRANGEMENT IN AUTOMATIC TELEPHONE EXCHANGE SYSTEM

Harold James Stirling, Tonbridge, Kent, and James George Taylor, Bexley, Kent, England, assignors to Associated Electrical Industries Limited, London, England, a British company Filed Mar. 26, 1964, Ser. No. 355,037
Claims priority, application Great Britain, Apr. 26, 1963, 16,533/63
16 Claims. (Cl. 179—18)

ABSTRACT OF THE DISCLOSURE

In an automatic telephone exchange system an incoming junction scanning arrangement in which each scan period is divided into two parts, in one of which an individual incoming junction is scanned for detecting a calling condition on the junction, while in the other of which a group of incoming junctions are scanned simultaneously for detecting dial impulses on any incoming calling junction of the group.

This invention relates to automatic telephone exchange systems.

In an automatic telephone exchange the lines connected to the exchange usually comprise, in addition to subscribers' lines, a number of incoming junctions which are terminated at the exchange on incoming junction circuits individual to the incoming junctions.

Upon the initiation of a call by a local subscriber served by the exchange, dial tone may be returned to the calling subscriber once the calling line has been afforded access to a register over some form of dial path coupling, whereupon the calling subscriber can dial the called line's number into the register. Thus, the speed of coupling of the register to the calling subscriber's line is not of paramount importance and in fact a saving in the total number of registers can be achieved if an extended time delay can be tolerated between the initiation of the call and the return of dial tone to the calling subscriber. With an incoming junction call, however, the call will have been routed to the exchange from a distant exchange under the control of one or more digits already dialled by the calling subscriber so that very rapid coupling of a free register to the calling incoming junction over a dial path will be necessary if the subsequent digits to be dialled by the calling subscriber for identifying the called line's number are to be received and stored by the register, more especially having regard to the fact that a substantial part of the dialling inter-digit pause will already have elapsed in searching for and finding the particular outgoing junction (corresponding to the calling incoming junction at the exchange under consideration) at the distant exchange.

This problem of affording very rapid dial path coupling between registers and calling incoming junctions may be alleviated to some extent by arranging that the incoming junction circuits terminating individual incoming junctions each include, in addition to the impulsing and cut-off relays, a digit storage element, for example a uniselector, for temporarily storing the first dialled digit to be received over the calling incoming junction during the time that a free register is being coupled up to the calling incoming junction and by arranging that the switching time of electromechanical switches for coupling registers to calling incoming junctions is reduced as much as possible. The provision of such temporary storage elements in incoming junction circuits is costly, however, and, in any case, the storing of the first received digit only over a calling incoming junction on the storage element of the appropriate incoming junction circuit may not provide sufficient time for a register to be coupled up to the calling incoming junction.

According to United States Patent No. 3,301,960 filed Dec. 13, 1962, a number of incoming junctions terminated at an exchange in an automatic telephone exchange system are arranged to be scanned by feeding scanning pulses to gating circuits associated, respectively, with the incoming junctions and arranged to be opened when their associated incoming junctions are in the looped condition. More specifically, for the purpose of detecting calls initiated on incoming junctions, scanning pulses derived from the electronic scanning means are applied in succession to the respective gating circuits at a rate which is sufficiently fast to ensure that if an incoming junction associated with a gating circuit being scanned by a scanning pulse is found to be in the looped or calling condition, then a free register can be coupled up to the calling incoming junction in question responsively to an output derived from the associated gating circuit without any appreciable risk of missing impulses dialled by the calling subscriber over the calling incoming junction to identify the called line's number.

After taking a register into use by coupling it up to the calling incoming junction over a dial path, the calling incoming junction is required to be scanned for the detection of dialled impulses and the storing of the dialled digits in the register. For this purpose, the speed of scanning of calling incoming junctions needs to be considerably faster than that required for initially coupling free registers to these incoming junctions, since in the worst condition the remainder of the inter-train pause left when incoming junctions assume the calling condition will be considerably longer than the minimum make period of dial impulses. This is conveniently achieved in United States Patent No. 3,301,960 by arranging that only calling incoming junctions, which have been coupled up to registers, are scanned for dial impulses. To this end, the electronic scanning means, as it feeds a scanning pulse to one of the aforesaid gating circuits, also feeds a pulse to one of the registers. The registers are scanned in turn contemporaneously with the scanning of the gating circuits. If the register being scanned has been taken into use for an incoming call, the calling incoming junction's identity stored in the register is signified to the electronic scanning means which accordingly feeds a scanning pulse to the gating circuit associated with the calling junction in question for the detection of dial impulses and the repetition of such impulses to the register over dial path means. This scanning arrangement thus provides for the scanning of one or two incoming junctions for each scanning position of the electronic scanning means. The first of these junctions is scanned for detecting the initiation of an incoming call, whereas another incoming junction will only be scanned for the supervision of dialling over the junction if the register being scanned has been taken into use for dealing with a call initiated on the junction in question.

One possible drawback with this specific form of junction scanning arrangement within the system according to United States Patent No. 3,301,960 may reside in the necessity for an engaged register to signify the identity of the incoming junction for which it was taken into use to the electronic scanning means prior to scanning of the incoming junction for the purpose of detecting dial impulses since, under fault conditions, the incorrect incoming junction's identity may be passed from the register to the scanning means and thereby put incoming calls in jeopardy by the scanning of incorrect incoming junctions by the electronic scanning means.

The present invention resolves this drawback without departing from the principle of scanning the incoming junctions terminated at the exchange initially for the detection of calls initiated on incoming junctions and the coupling up of free registers to these junctions preparatory to dialling over calling incoming junctions and subsequently for the detection and supervision of dialling over incoming junctions for which registers have been taken into use.

According to the present invention there is provided in an automatic telephone exchange system a scanning arrangement for scanning incoming junctions terminated on incoming junction circuits at an exchange including registers to which calling incoming junctions can be afforded access for the purpose of registering the identities of calling incoming junctions and called lines' numbers, said scanning arrangement comprising electronic scanning means effective during one part of each scan period (i.e. that period for which the electronic scanning means assumes each of its scan positions during the scan cycle) to scan a different one of said incoming junctions for detecting the initiation of a call on said junction and the seizure and coupling up of a free register to said incoming junction if it is found in the calling condition and said scanning means being effective during another part of said scan period to scan a group of the incoming junctions for detecting dial impulses on any calling incoming junction of said group in respect of which a register has already been taken into use by extending dial path means to the register pertaining to the calling junction.

With the scanning arrangement according to the invention the effective scanning speed of the electronic scanning means is increased for the purpose of supervising dialling on calling incoming junctions without the necessity for passing the identities of calling junctions' numbers from registers to the electronic scanning means, by scanning a group of incoming junctions simultaneously during each scan period of the scanning means.

The electronic scanning means may simply take the form of a composite counter conveniently comprising a number of transistor bistable circuits suitably connetced for providing a total count capable of accommodating the total number of incoming junctions to be scanned. The counter or other scanner may comprise two parts, one of which provides for the scanning of a group of incoming junctions simultaneously, such as by applying a scanning pulse in common to a plurality of gating circuits associated, respectively, with the incoming junctions of said group, while the other part of the scanner serves, in combination with the first-mentioned part, for scanning one of the incoming junctions of said group. Thus, during the aforesaid one part of each scan period of the scanning means, both parts of the electronic scanner would combine to scan a particular incoming junction, whereas for the scanning of the group of incoming junctions only the first-mentioned scanner part will be effective.

During the aforesaid one part of each scan period, the electronic scanning means may be arranged for extending to all of the registers in common a marking identifying to the registers a particular calling incoming junction that is being scanned by the scanning means. This junction identity marking is then compared with incoming junction identities already stored within registers that have been taken into use for dealing with incoming calls. If the calling incoming junction being scanned by the electronic scanning means has not already been stored in one of the registers, a free register previously selected by a register allotter may be seized for dealing with the incoming call on the calling incoming junction, whereupon the identity of the latter will be stored in incoming junction identity stores of the register taken into use. If, on the other hand, the particular incoming junction being scanned at this time is not only in the calling condition, but has already taken a register into use, as just above described, then junction identity comparator means provided for comparing the junction identity marking extended to the registers in common from the electronic scanning means with the incoming junction identities actually stored within registers will respond to prevent a further register from being seized for dealing with the call. Alternatively, the incoming junction being scanned by the electronic scanning means may be found not to be in a calling condition, in which case the circuitry for effecting seizure of a free register will remain inoperative.

As previously mentioned, the electronic scanning means may take the form of a counter comprising a number of suitably connected transistor bistable circuits. The incoming junction identity stores in the registers may also comprise transistor bistable circuits, in which case it is especially contemplated that the comparator means referred to above may comprise, in accordance with United States application No. 353,861, pulse-plus-bias gating circuits associated with corresponding bistable circuits in the electronic scanner counter and the incoming junction identity stores of a register. Correspondence between the conditions of transistor bistable circuits of the scanner counter and those of the incoming junction identity stores of an engaged register will cause associated gating circuits to be opened so that the outputs therefrom may conveniently be applied to the inputs of an "AND" gate to obtain a response for preventing seizure of another register. As is fully described in United States application No. 353,861, the use of pulse-plus-bias gates as the comparator means between the scanner and the register affords considerable advantages as regards cost and also as regards security since the gates only provide A.C. coupling between the scanning means and the registers, thereby preventing the extension of D.C. faults in either direction between the scanning means and registers.

During the said other part of each scan period, the group of incoming junctions that are scanned includes the incoming junction scanned during the said one part of the scan period and for this purpose means may be provided for overriding that part of the scanner counter which otherwise serves for selecting one junction from the group of junctions selected by the other part of the scanner counter. This may conveniently be achieved by arranging that dial path means, comprising a plurality of pulse highways equal in number to the number of incoming junctions constituting each group and these highways being connected to corresponding junctions in each group of incoming junctions connected to the exchange, extend from the electronic scanning means to all the registers in common and by arranging that the highways are opened by gating circuits capable of being opened individually under control of the appropriate part of the scanner counter for the purpose of scanning an individual incoming junction of the group selected by the other part of the scanner counter and adapted to be opened in common for the purpose of scanning the entire group of incoming junctions by appropriate operation of the overriding means referred to above. Scanning of the group of incoming junctions is for the purpose of detecting and counting dial impulses received over a calling incoming junction. Any register having stored therein the identity of any of the junctions of the group being scanned will respond to the dial impulses detected on the pulse highway appertaining to the particular incoming junction for which the register has been taken into use so that in response to cyclic scanning of the incoming junction by the scanner the register can count and store within it the identity of the called line's number.

The operation of the scanner counter and the duration of the total scan period, as well as the sequencing and duration of the respective parts of the scan period, will be under the control of timing and sequence control means conveniently comprising a part of the electronic scanning means.

The exchange may also include one or more dummy registers which are arranged to be seized by incoming calls on incoming junctions only when all the other registers have been taken into use. The function of the dummy registers is to prevent call failure by extending busy tone back over the calling junction to indicate that all of the registers are busy. Thus, the dummy registers will have identified to them from the electronic scanning means the identities of calling incoming junctions during the aforesaid one parts of scan periods and will be seized so as to extend busy tone back to the calling incoming junction whose identity is stored within the register and provision may also be made for disconnecting the incoming junction loop in the incoming junction circuit consequent upon the feeding of busy tone back over the incoming junction.

The incoming junction identity stored within any of the registers including the dummy register or registers may be encoded in suitable form for transmission to a translator which provides a translation of the identity of the calling incoming junction for routing of the call through the exchange or for the return of busy tone over the calling incoming junction when the translator couples itself to the register in question.

For a better understanding of the present invention one exemplary embodiment of it will now be described with reference to the accompanying drawings, in which:

FIGS. 2 to 4 are intended to be arranged relatively to one another;

Figure 7:
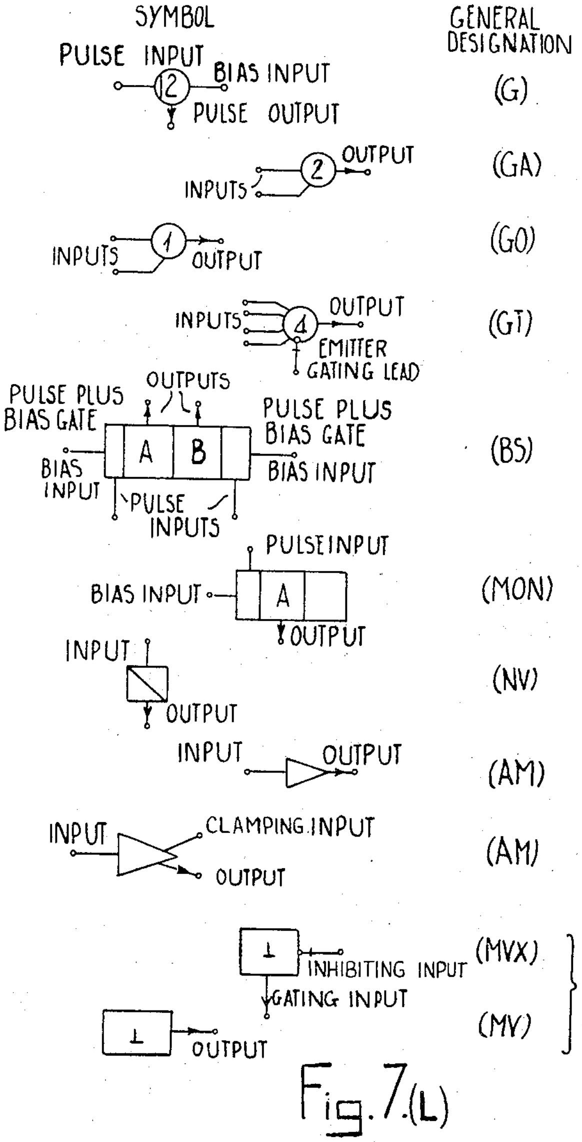

FIG. 7 contains a glossary of symbols employed in FIGS. 2 to 5; and

Figure 5:
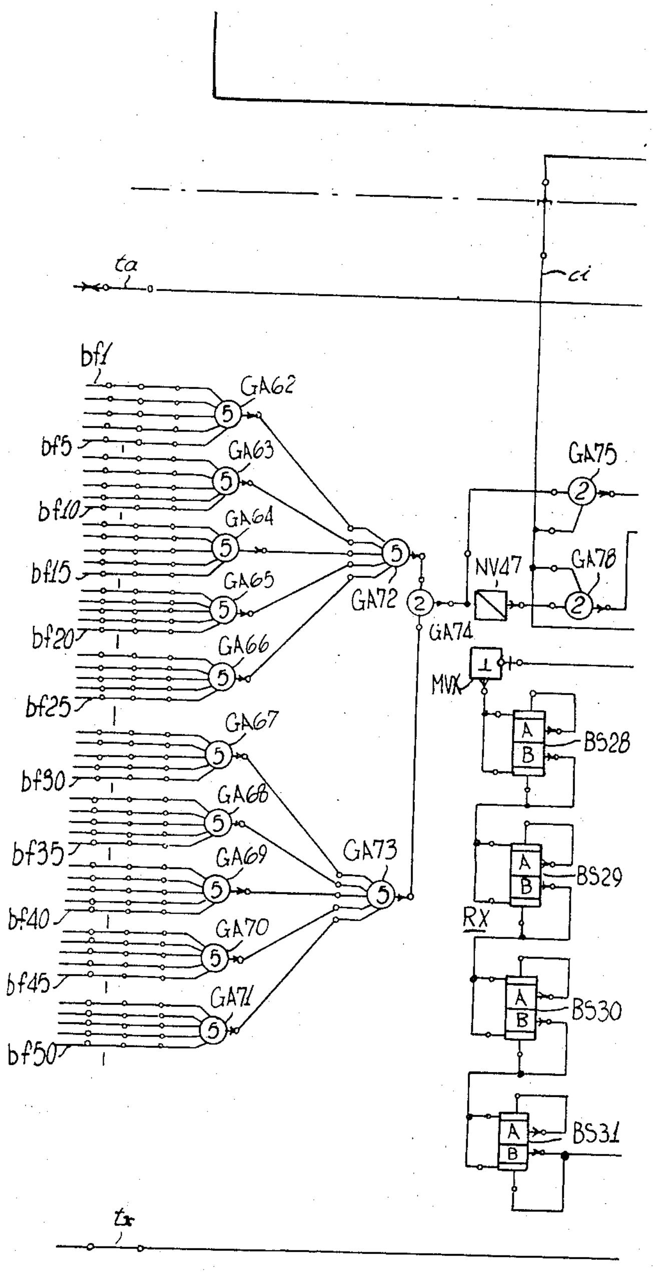
Figure 5:
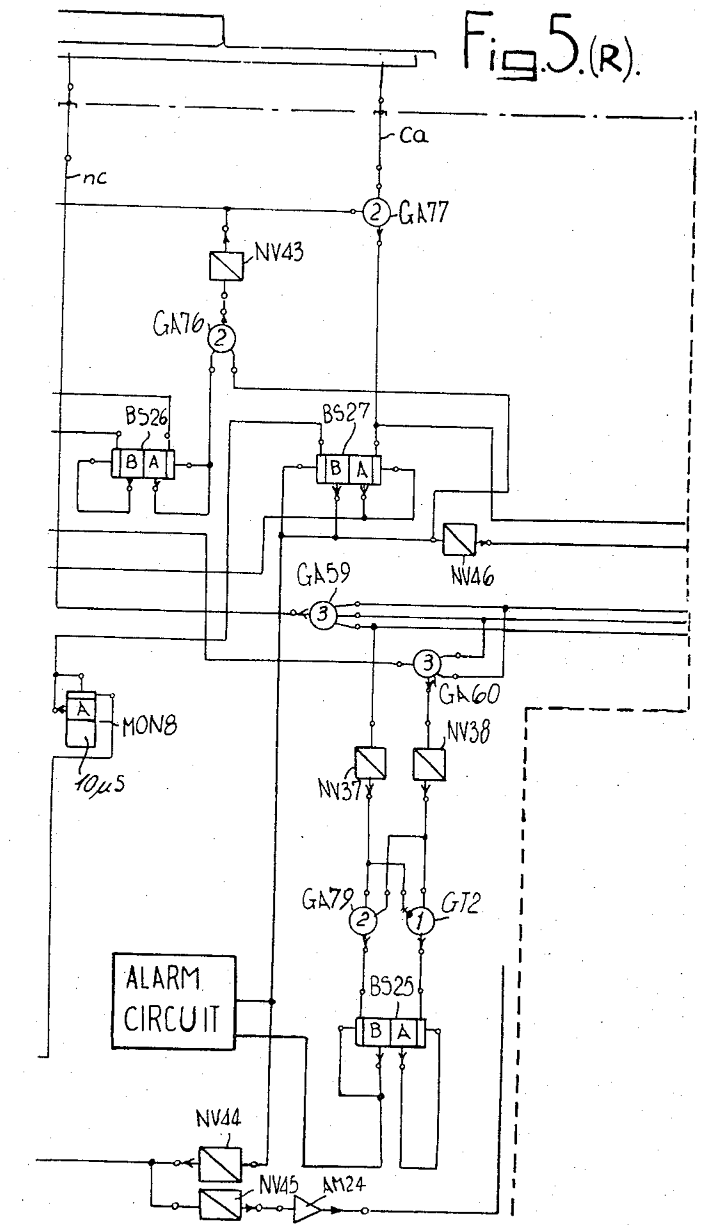
Figure 6:
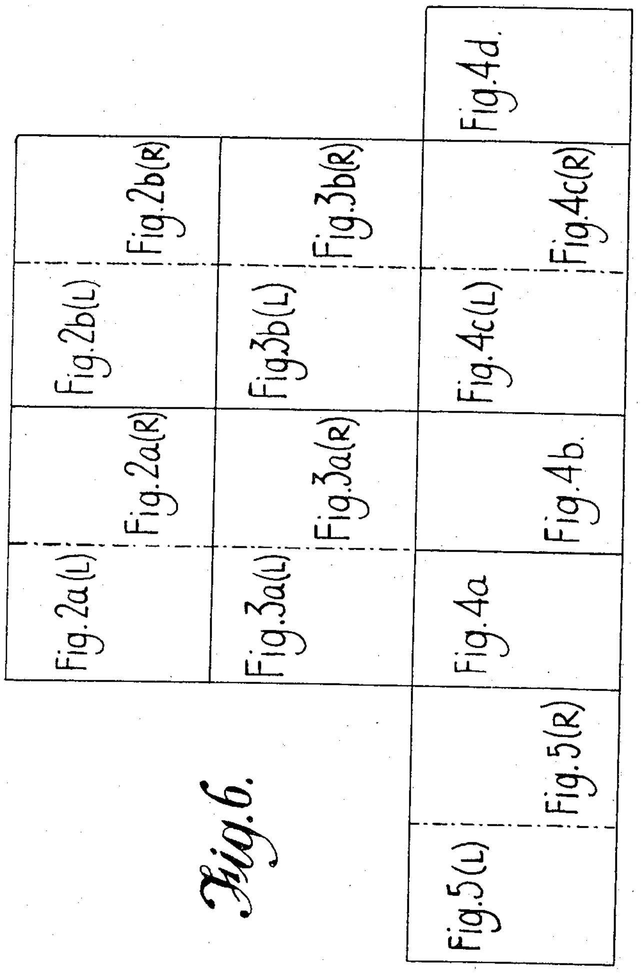
FIG. 6 is a diagram showing how
Figure 8:
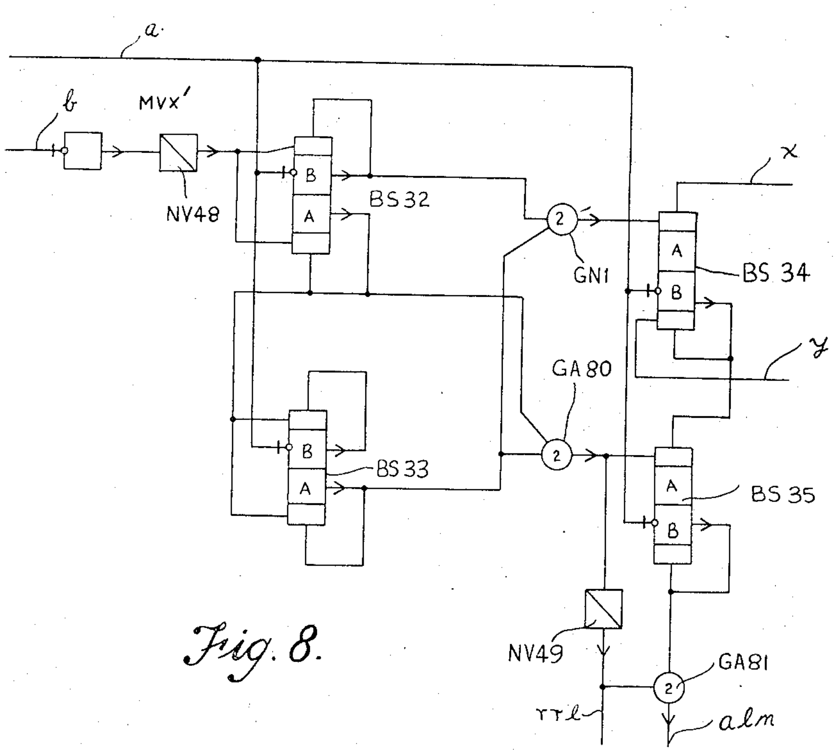

FIG. 8 is a circuit diagram of an alternative timing arrangement to that included in FIG. 5.

Figure 1:
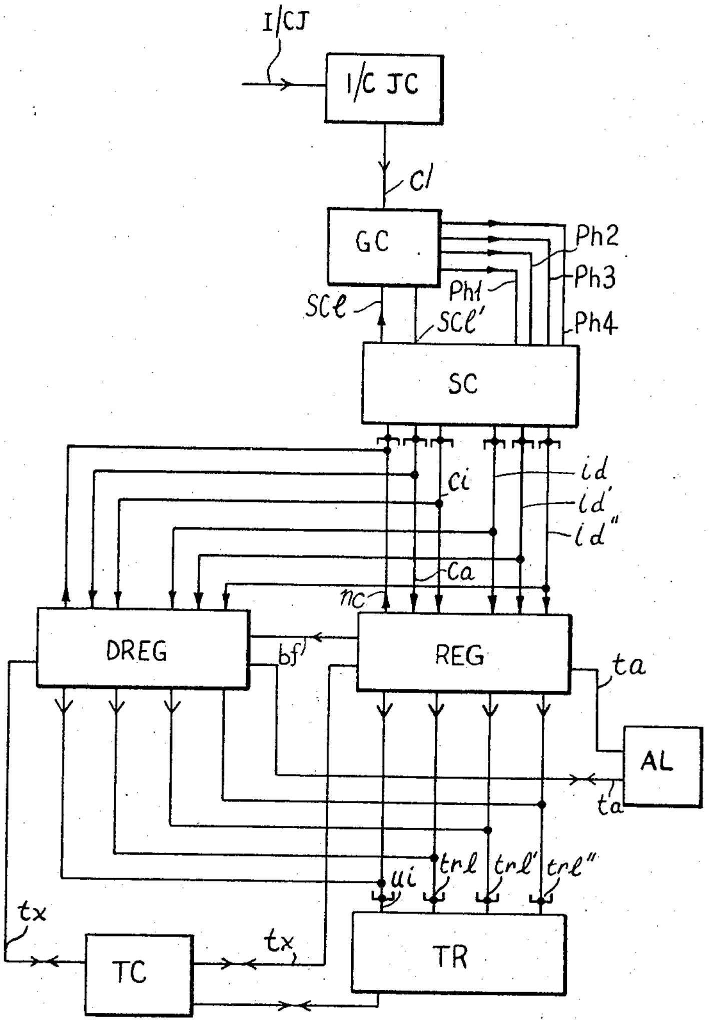
FIG. 1 is a block schematic diagram showing parts of an automatic telephone exchange including an incoming junction scanning arrangement according to the present invention.
Figure 2A:
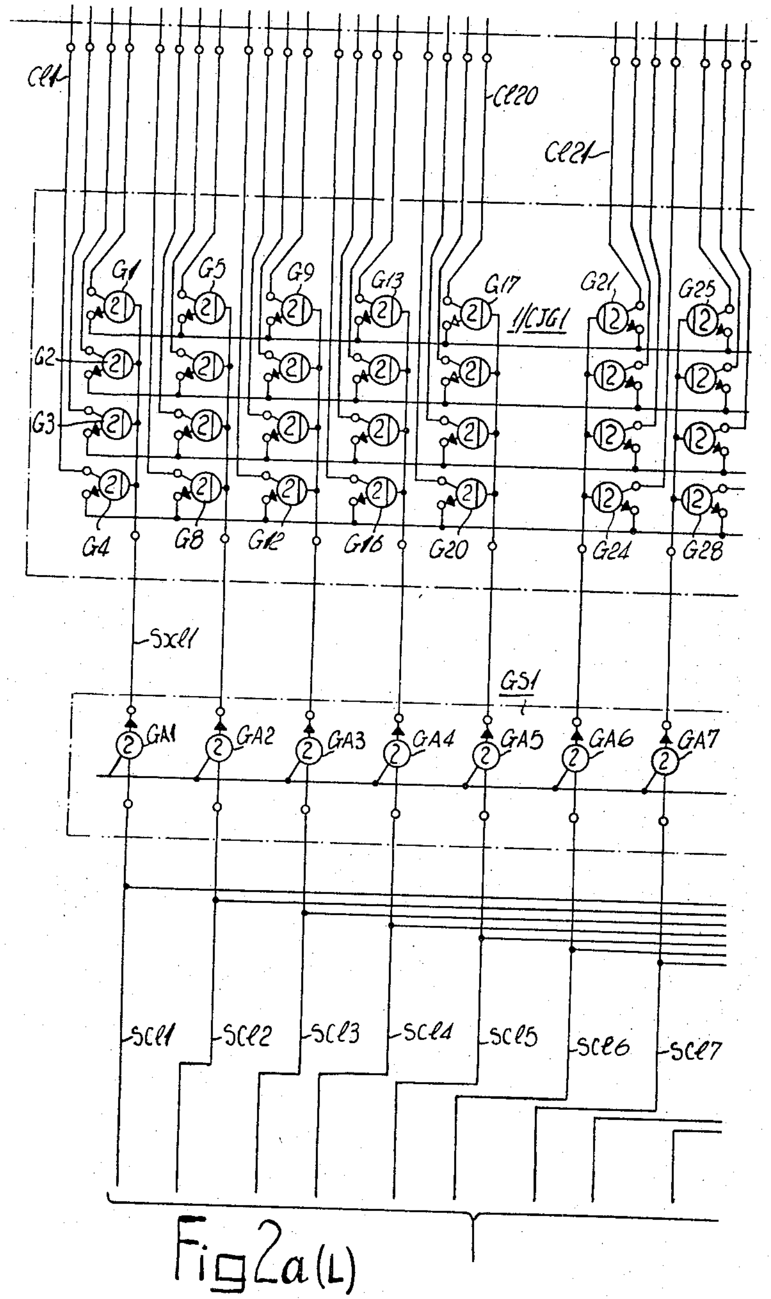
FIGS. 2 to 5 are detail circuit diagrams of some of the parts shown block schematically in FIG. 1.
Figure 2A:
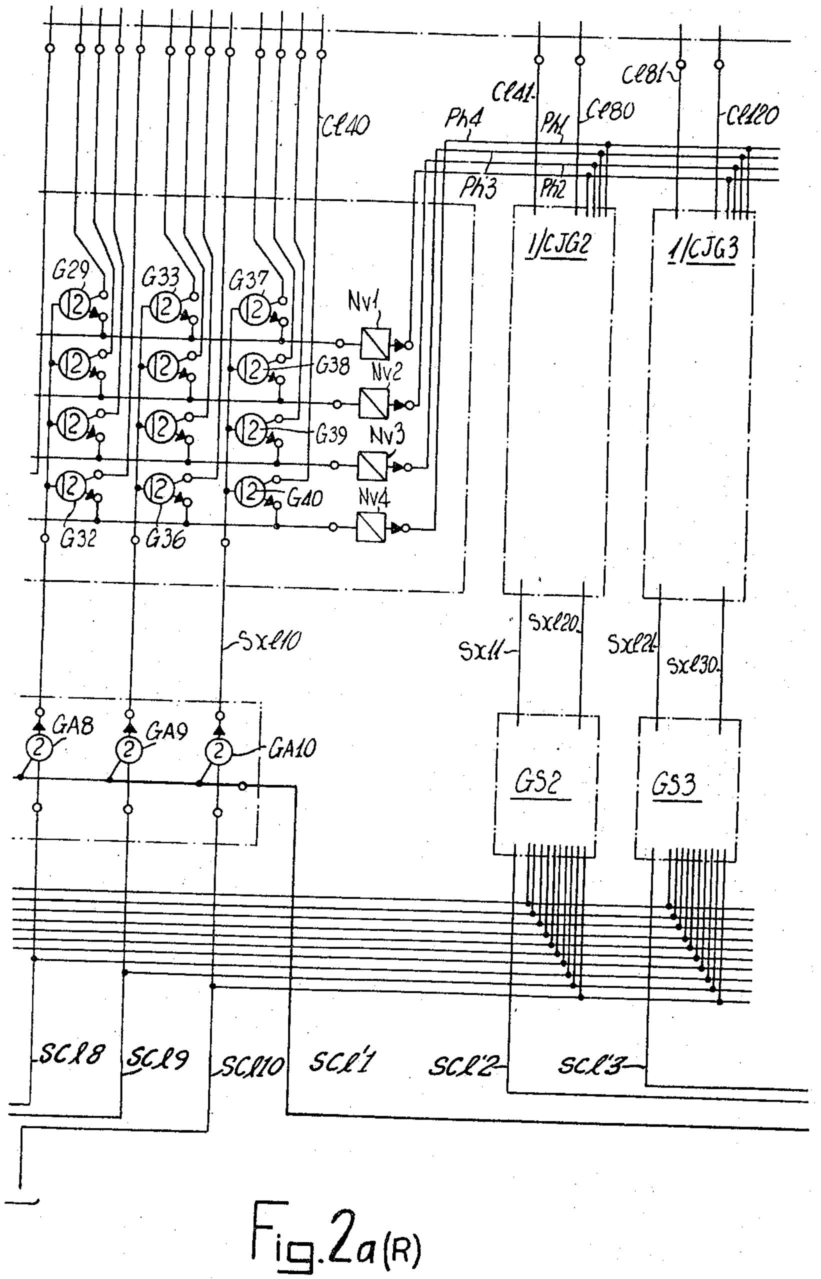
Figure 2B:
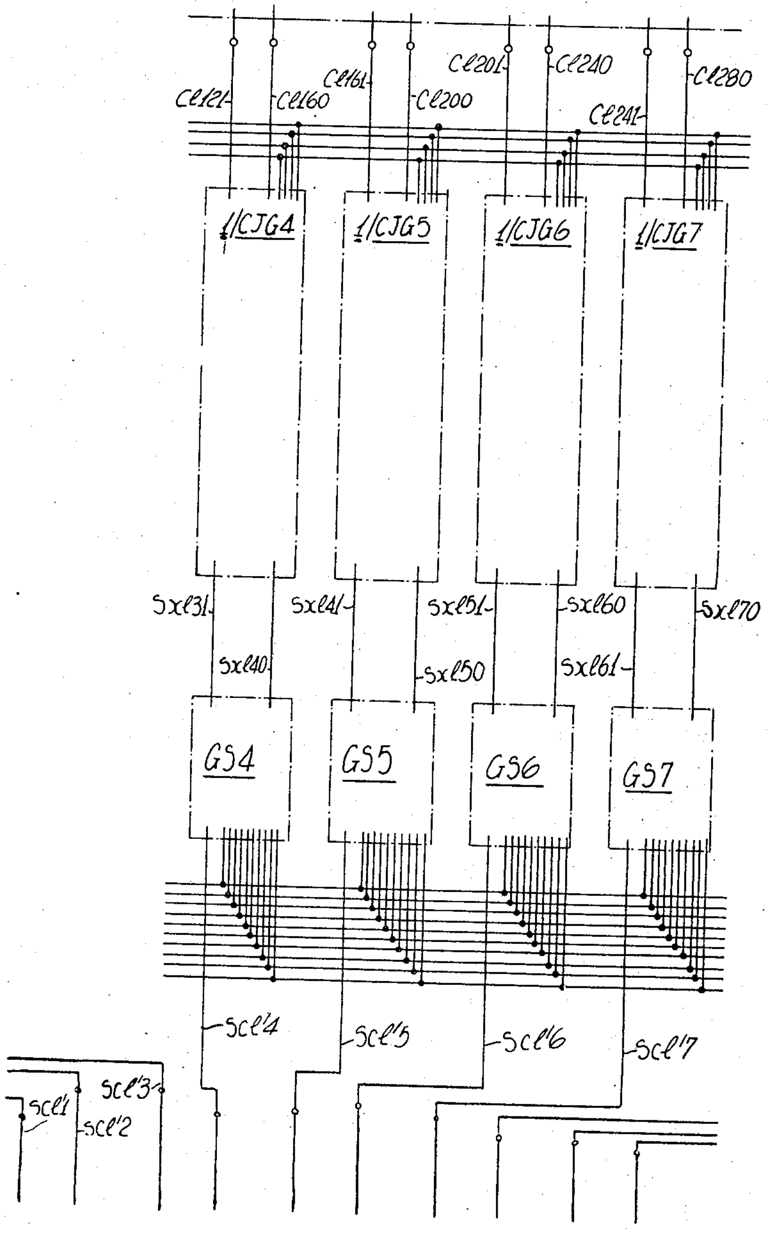
Figure 2B:
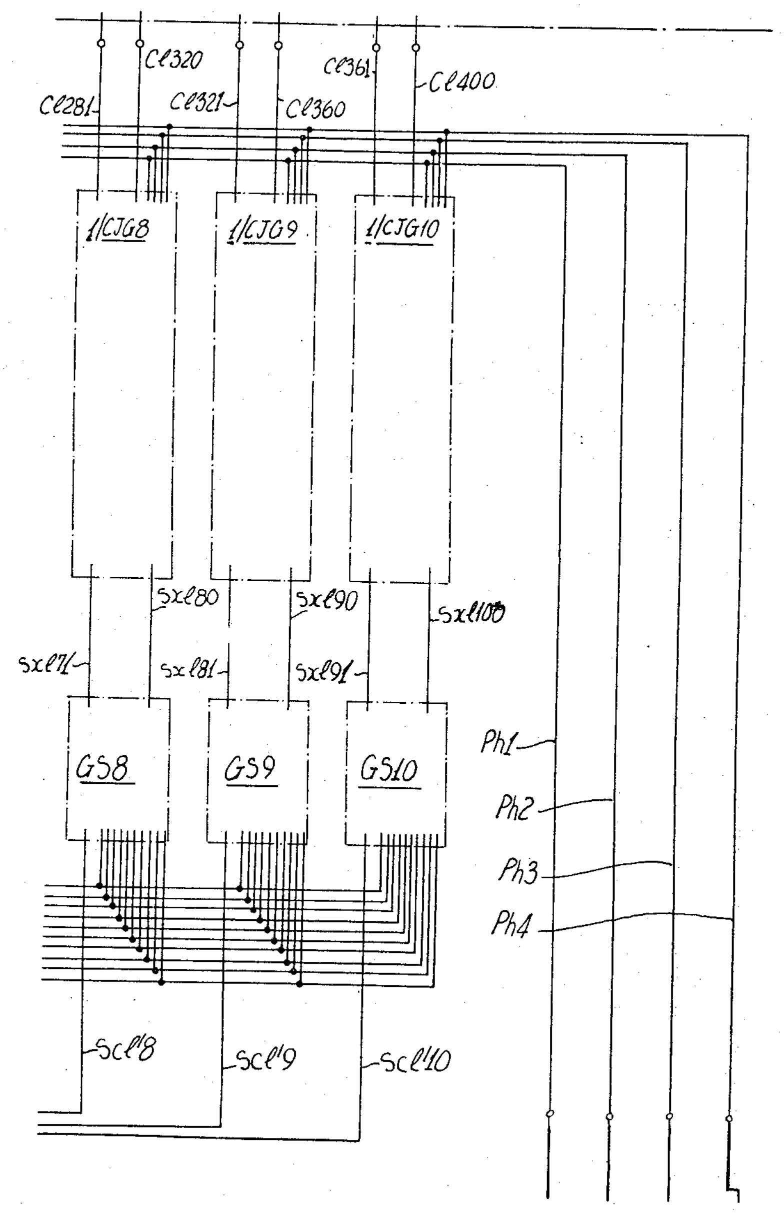
Figure 3A:
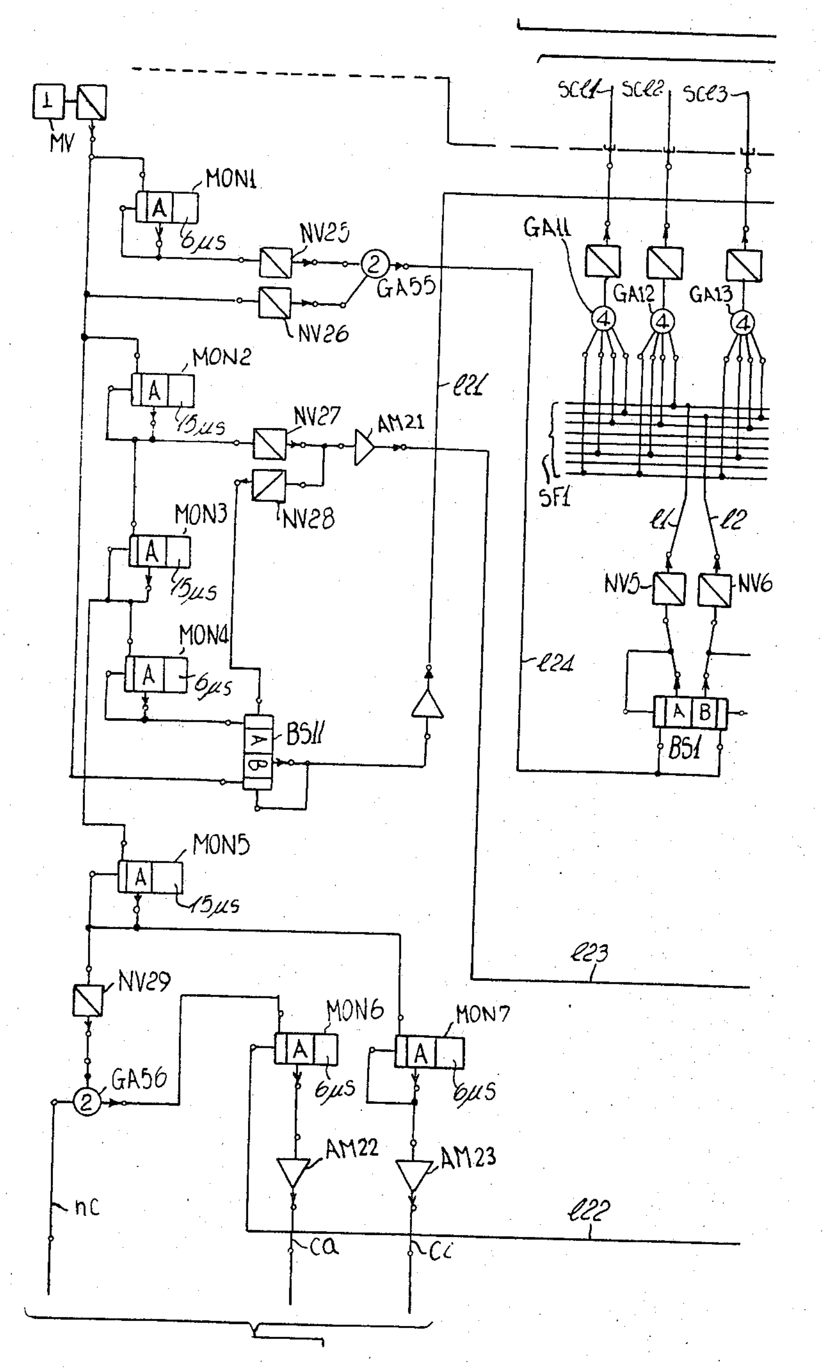
Figure 3A:
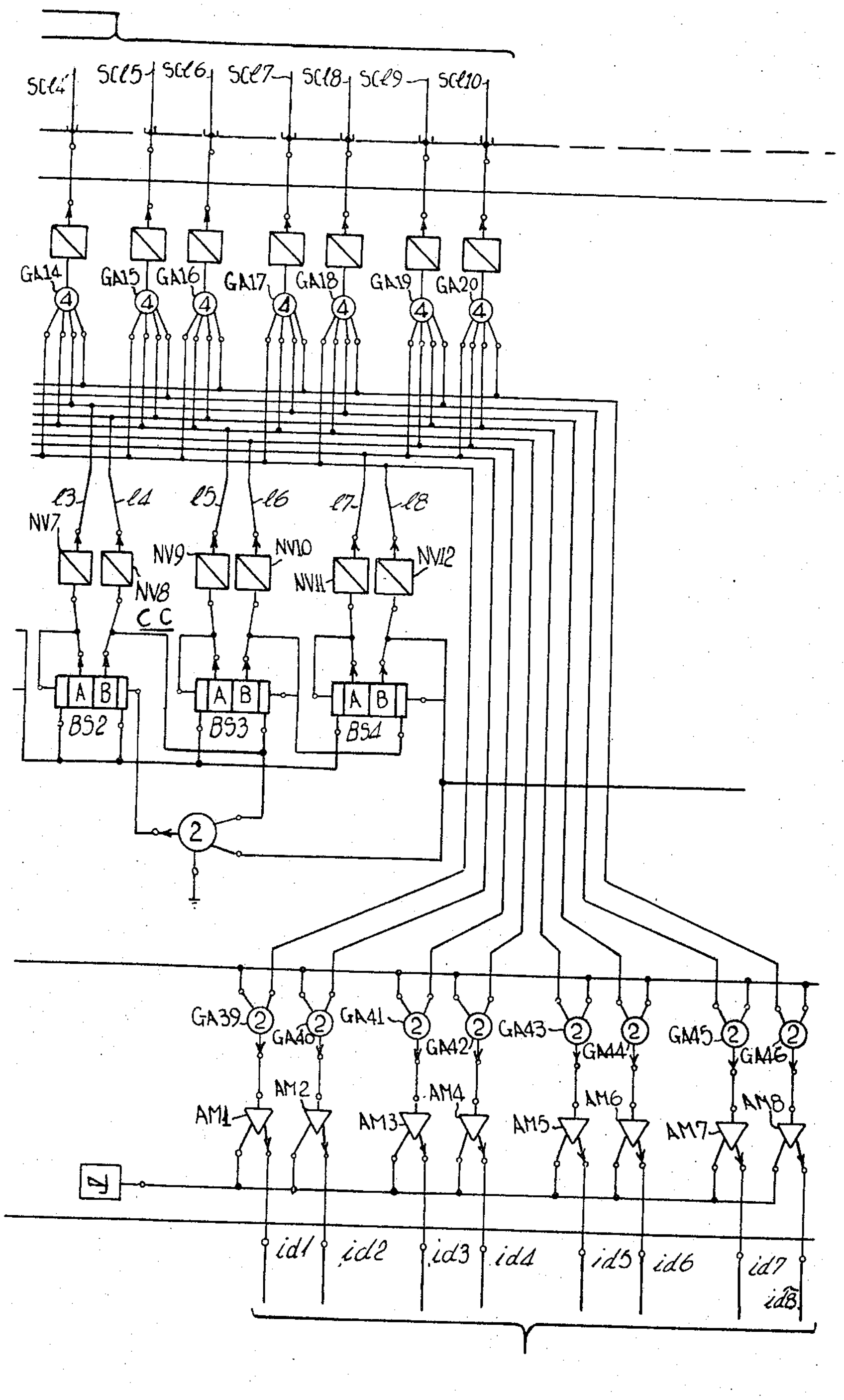
Figure 3B:
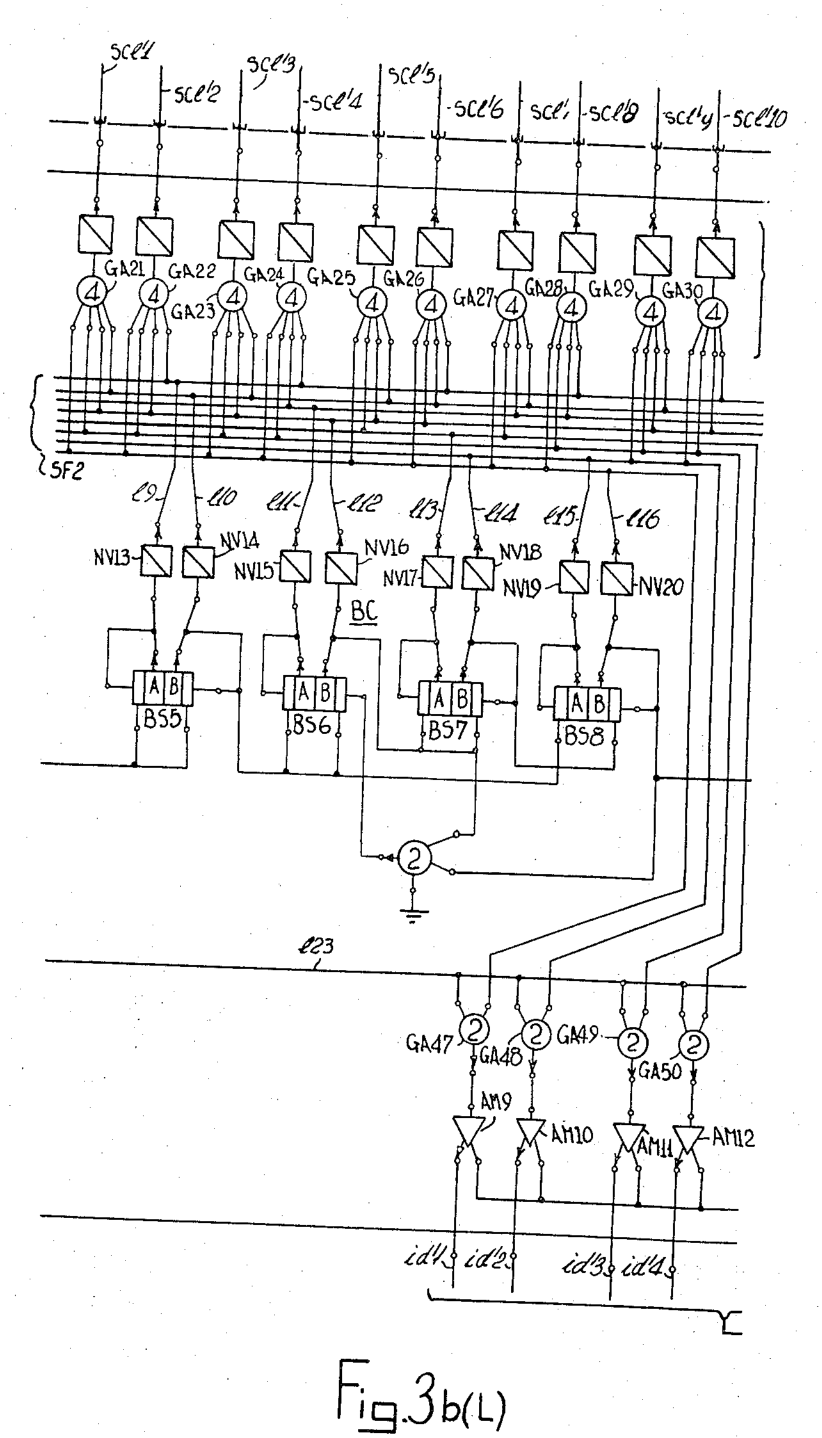
Figure 3B:
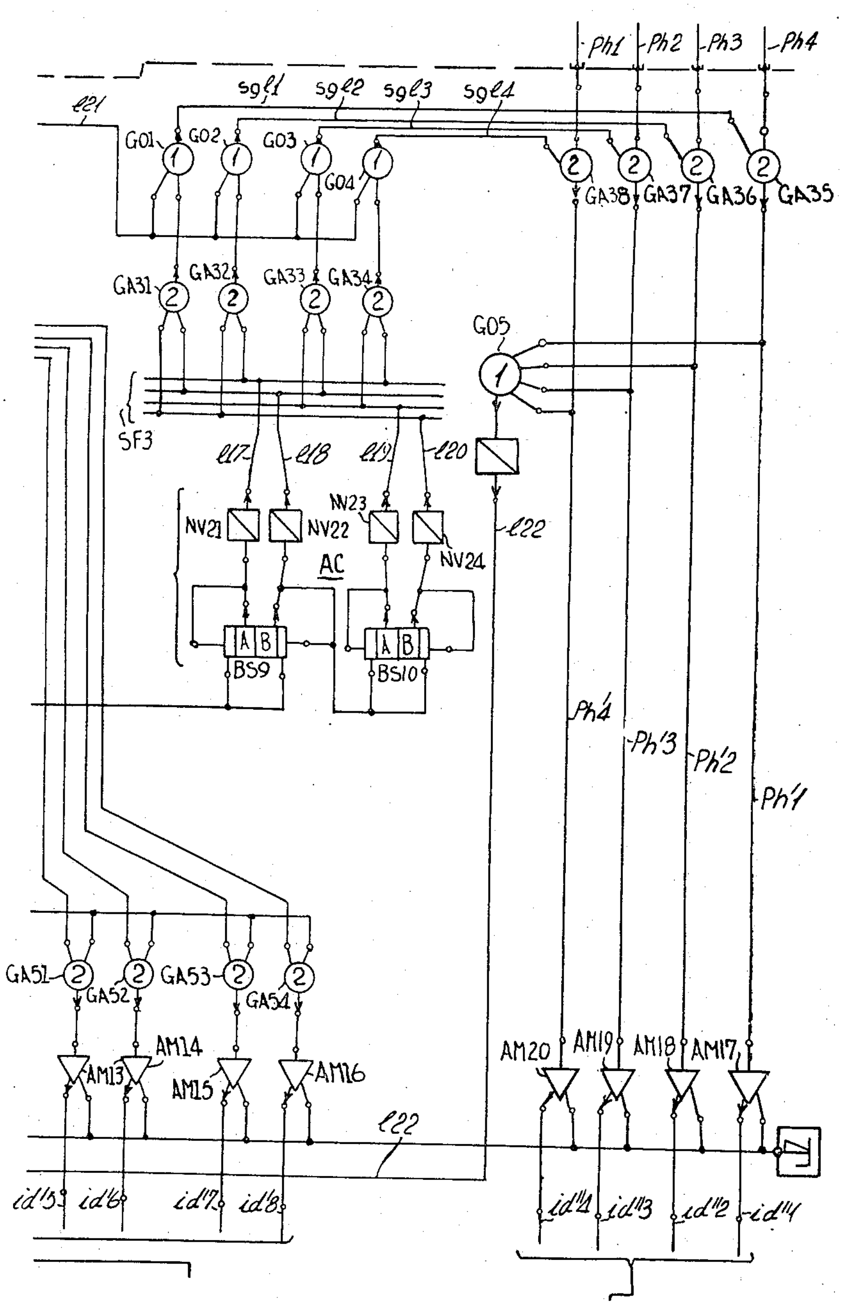
Figure 4A:
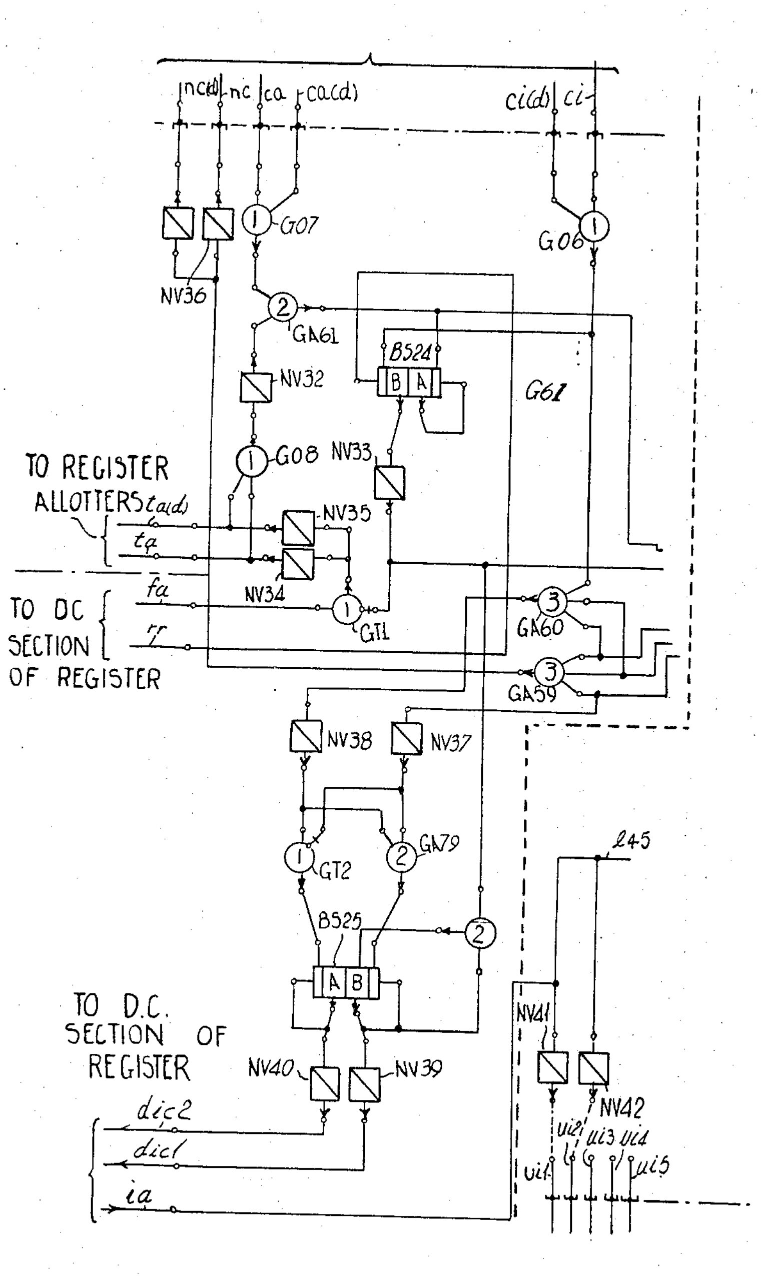
Figure 4B:
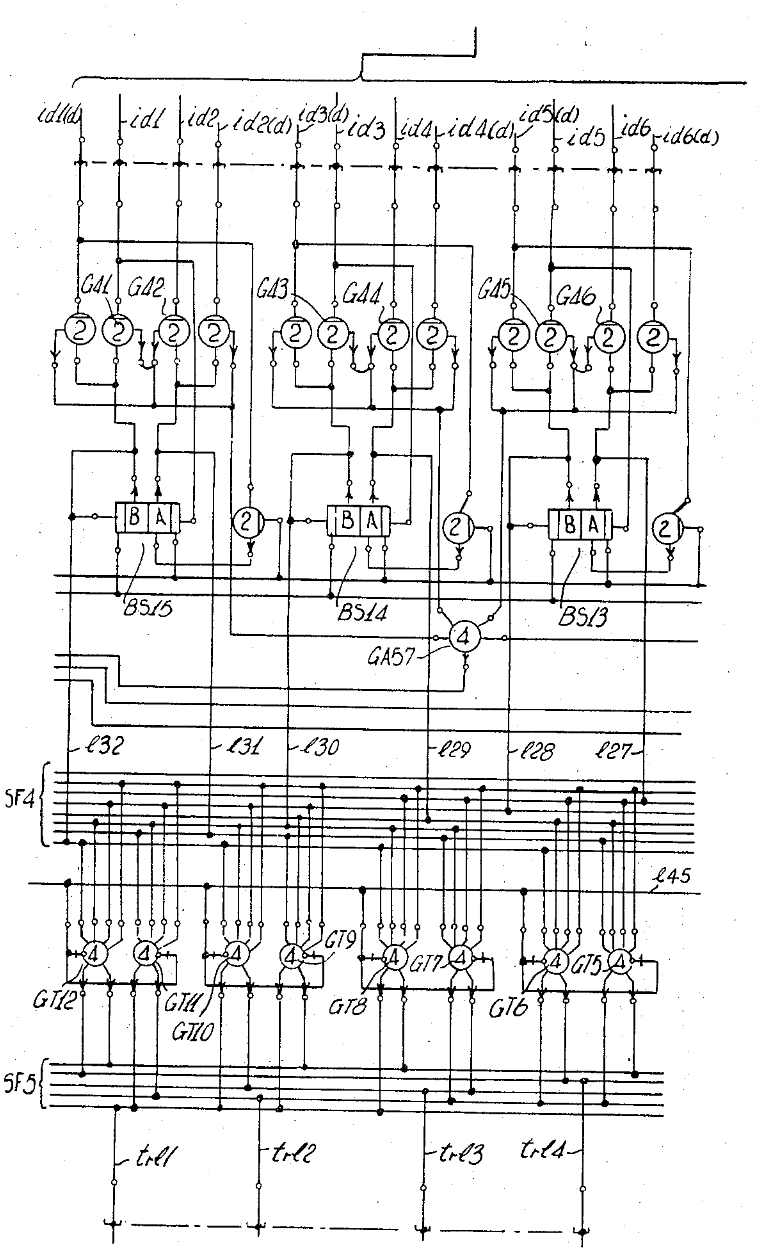
Figure 4C:
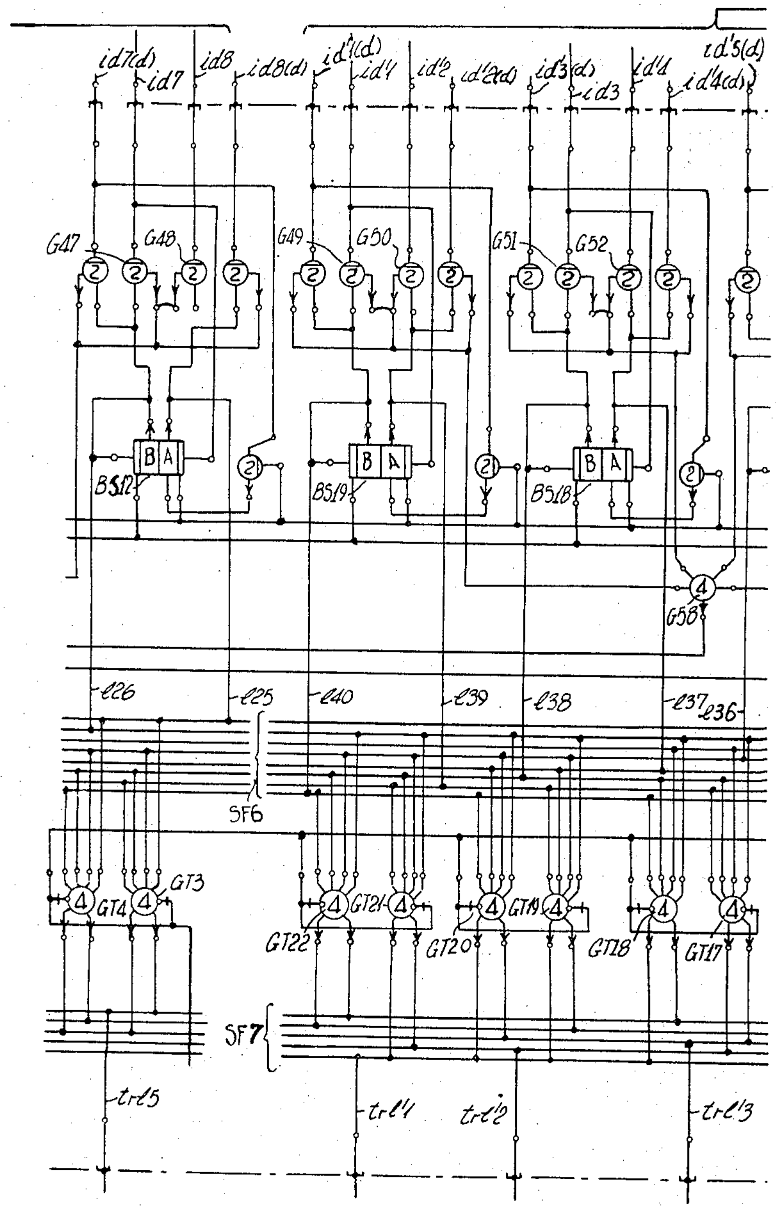
Figure 4C:
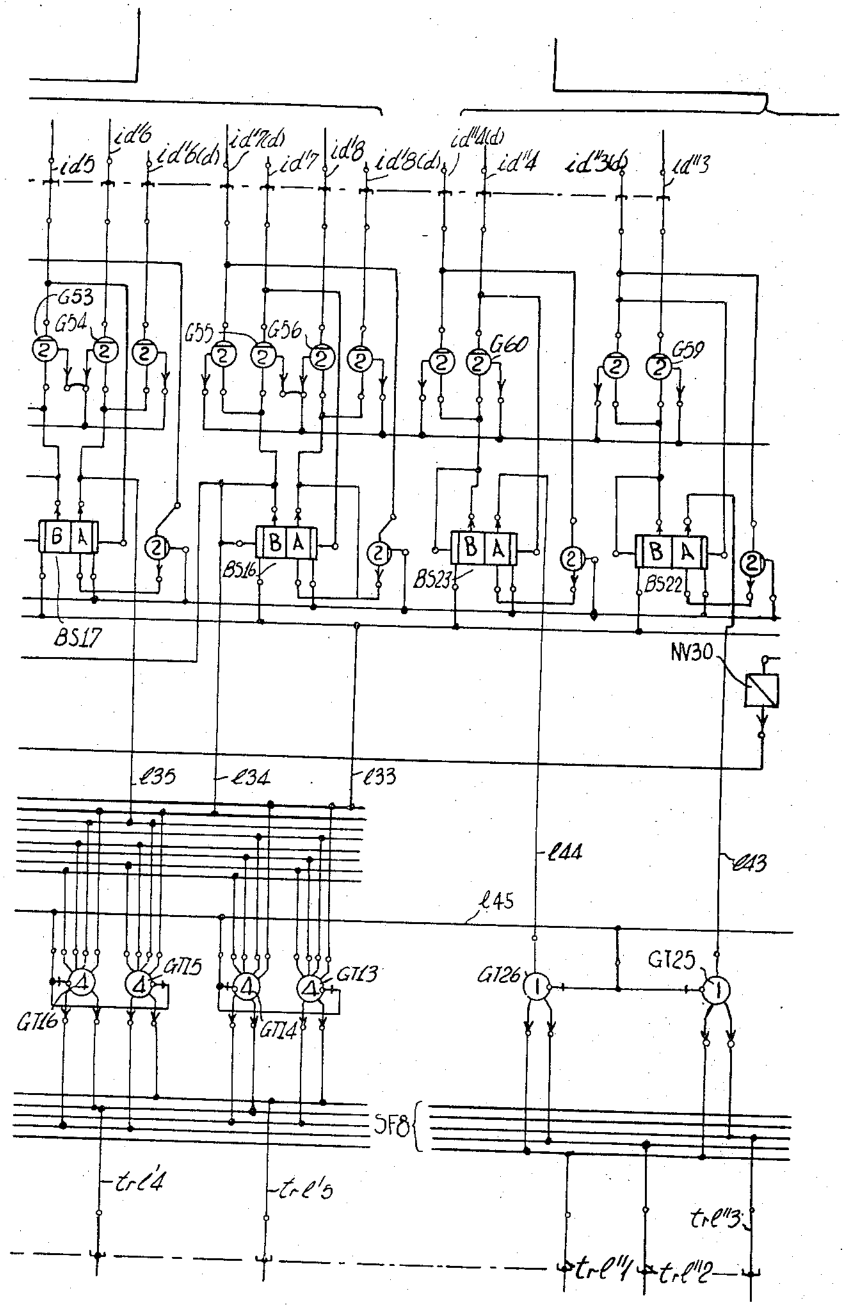
Figure 4D:
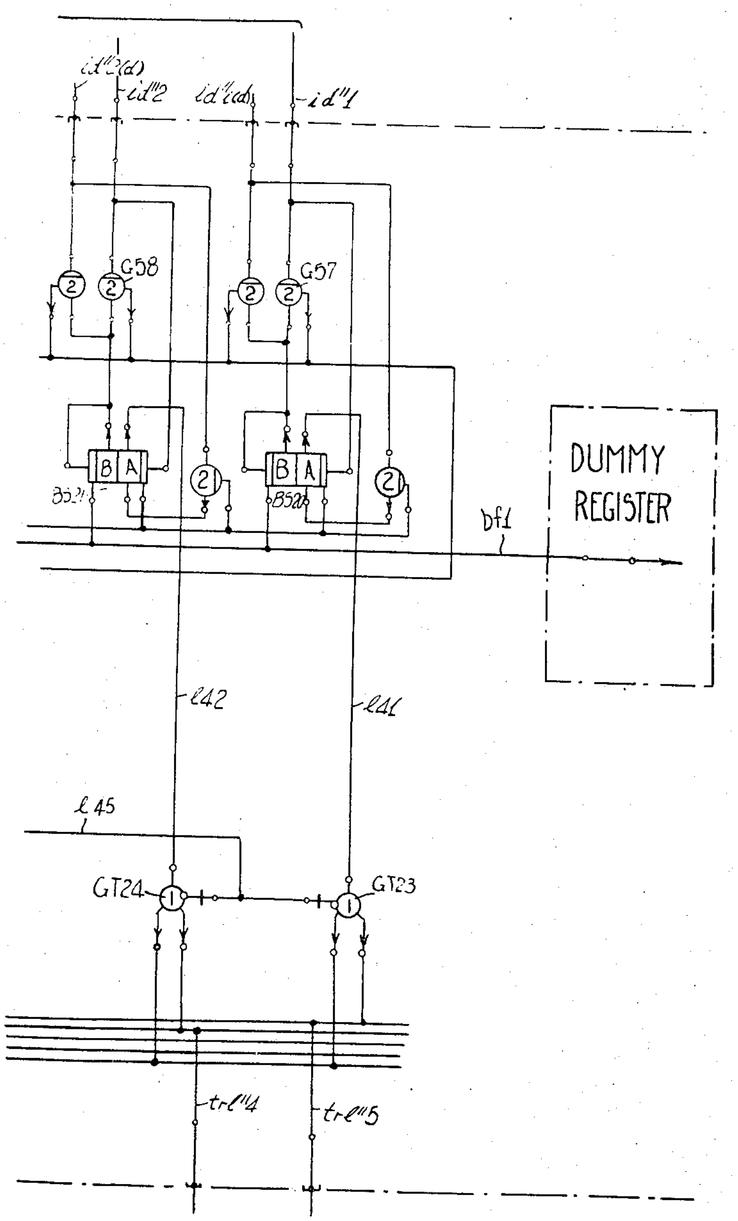

Referring to FIG. 1 of the drawings, the parts of the exchange which have been shown for the purpose of describing the present invention include one incoming junction circuit I/CJC of a number of such circuits each terminating an incoming junction, such as the incoming junction I/CJ. The incoming junction circuits, such as the junction circuit I/CJC, are capable of signifying the condition of their associated incoming junctions (i.e. looped or open circuit condition) to pulse-plus-bias gates, hereinafter referred to as incoming junction gates, individual to the respective incoming junctions, over call leads, such as the call lead *cl*. These call leads are connected to the bias inputs of the incoming junction gates which are accommodated, together with further gates, the purpose of which will be described later, within a gating circuit arrangement designated GC which serves all of the incoming junction circuits. The incoming junction gates are arranged to define a plurality of groups each of which is divided into sub-groups. The incoming junction gates of a sub-group have their pulse inputs connected in common. Let it be assumed that there are four hundred incoming junctions terminated, respectively, on incoming junction circuits, such as the circuit I/CJC. The incoming junction gates may then be divided into ten groups each comprising forty incoming junction gates and each of these groups may themselves be divided into ten sub-groups of four gates each having their pulse inputs connected in common. Pulse outputs from corresponding incoming junction gates of the sub-groups of all the groups are connected to dial path means serving all of the incoming junction gates. In the present example, the dial path means will comprise four pulse highways designated *ph*1 to *ph*4 since each of the gate sub-groups contains four incoming junction gates. These pulse highways extend into an electronic scanner SC for scanning the incoming junction gates (and thus the incoming junctions to which the incoming junction gates pertain) individually and in groups of four (i.e. the sub-groups of incoming junction gates). The electronic scanner SC, which will be described in detail with reference to FIG. 3 of the drawings, comprises a composite counter having a total count of four hundred so that the counter is capable of scanning each of the incoming junctions terminated at the exchange. This counter is divided into two main parts, one of which has a total count of one hundred, while the other part of the counter has a total count of four. That part of the composite counter which has a total count of one hundred itself conveniently comprises two counters each having a total count of ten which apply one-out-of-ten markings to respective sets of ten scanner leads represented in FIG. 1 by the single leads *scl* and *scl'*. These two sets of leads are connected up to gating circuits within the circuit GC which serve for combining the one-out-of-ten markings to mark one out of a set of one hundred leads extending, respectively, to the sub-groups of four incoming junction gates and connected with the commoned pulse inputs of the appertaining sub-grouped gates. The markings extended over the scanner leads *scl* and *scl'* serve to bring about scanning of a different sub-group of four incoming junction gates for each count position of the composite scanner counter. In addition, the scanner counter having a total count of four is capable of scanning one of the pulse highways *ph*1 to *ph*4 which is connected to the pulse output of a particular incoming junction gate of the sub-group being scanned. It will thus be appreciated that the condition of one incoming junction gate (i.e. open or closed) signifying the looped or open circuited condition of the associated incoming junction can be ascertained by the combined scanning action of both parts of the composite scanner counter, whereas the condition of all four of the incoming junction gates of the same sub-group can be ascertained by arranging that the scanner counter having a total count of four is rendered ineffective.

The composite counter of the electronic scanner SC is arranged for extending to registers, such as the register REG, over sets of leads represented by the leads *id*, *id'* and *id''*, markings corresponding to a count position of the composite scanner and the identity of a particular calling incoming junction gate or incoming junction.

The duration of the scan period of the composite scanner counter (i.e. that period for which the composite counter is located in a particular count position) is controlled by timing elements in the scanner to be fully described later. Each scan period of the scanner SC is divided into two parts. During the first part of each scan period, the composite scanner counter is effective for scanning one particular incoming junction. This is for the purpose of detecting the initiation of a call on that junction, as will hereinafter be described. During the second part of the scan period, however, the scanner counter having a total count of four is rendered ineffective in order to scan simultaneously the four incoming junctions pertaining to the sub-group of four incoming junction gates for the purpose of supervising dialling on any of the four incoming junctions.

As previously mentioned, the supervision of dialling on calling incoming junctions necessitates a considerably higher junction scanning rate than the detection of new calls on incoming junctions. In this connection, to ensure the detection of all dial impulses received over a calling incoming junction, it is necessary to scan the calling incoming junctions every seven milliseconds or less. In the present example, the composite scanner counter is arranged to be driven from a multivibrator providing a twenty kc./s. signal. Since the composite scanner counter has a total count of four hundred, it will complete its count cycle every twenty milliseconds. The two scanner counters, providing between them a count of one hundred for scanning a sub-group of four incoming junction gates, are arranged to step the counter having a total count of four each time they complete a count cycle. Thus, a count cycle of the hundred counter is completed every five milliseconds. Accordingly, the incoming junctions are scanned for new calls every twenty milliseconds and are scanned for the supervision of dialling every five milliseconds. Each scan period will accordingly have a duration of fifty microseconds.

During the first part of each scan period of the electronic scanner SC, the latter identifies to all of the registers, such as the register REG, the particular incoming junction being scanned if the junction is in the looped condition. The identification is made over the sets of leads *id, id'* and *id''* by the opening of gates in the scanner SC under control of the timing and sequencing elements to be described later. Comparator elements, which will be described with reference to FIG. 4 of the drawings, compare the calling incoming junction identity passed to the registers with the identity of any calling incoming junction already stored in junction identity stores of the registers. If the comparator elements in any of the registers, such as the register REG, find correspondence between the junction identities in question, an inhibit signal will be applied by the register to a new call ask lead *nc* to prevent seizure of a further register. In this connection, it may be mentioned at this point that, for the seizure of a free register in respect of a new call, no correspondence must be found by the comparator elements of any register and consequently there will be no inhibit signal present on the new call ask lead *nc*. A free register, which will already have been selected by a register allotter AL comprising a one-only selector, when the conditions, just described above, obtain, is seized from the scanner SC by a seize signal passed to it over a new call answer lead *ca*, whereupon the register will be busied to the allotter AL and the incoming junction identity stores within the register will be opened to enable the stores to be set in accordance with the identity of the calling incoming junction for which the register has been taken into use.

For the second part of the scan period, the effective count position of the scanner counters jointly having a total count of one hundred is identified to the registers in common over sets of leads *id* and *id'* and this identifies a particular sub-group of four incoming junction gates or incoming junctions. These four junctions are scanned simultaneously for detecting dial impulses and for this purpose four gates connected in the respective pulse highways are arranged to be primed by a signal derived from the scanner timing and sequencing elements so that pulse outputs will be extended to the registers over one or more of the leads *id''* if the incoming junctions appertaining to the sub-group of incoming junction gates, to which the pulse highways are connected, are in the looped condition. Since registers will have already been taken into use for these incoming junctions on which dialling is to be supervised, only these engaged registers will respond to correspondence found by the comparator elements of the registers between the identities of the calling incoming junctions extended to the registers over the sets of leads *id, id'* and *id''* and the identities of the calling incoming junctions already stored within the registers. Thus, in the present embodiment, a maximum of four registers can respond at the same time to supervise dialling as a result of correspondence found between the stored incoming junction identities and those identities extended to the registers from the electronic scanner SC. Each time a sub-group of incoming junction gates is scanned during successive scanning cycles of the scanner SC, a pulse will be applied to an appropriate one of the pulse highways *ph*1 to *ph*4 to open the primed gate in this highway and thereby produce a marking on one of the set of leads *id''* if there is a dial loop impulse on the appertaining calling incoming junction at the instant of scanning. The marking accordingly applied to one of the set of leads *id''* will elicit a response from the register taken into use for dealing with the call on the incoming junction in question.

Such response of a register enables the register, during successive scanning cycles, to count and store within itself the dial impulses received over the calling incoming junction for the purpose of identifying the called line's number. After at least some of the dialled digits have been received and stored in the register, a translator TR may couple itself to the register for obtaining the identification of the calling incoming junction and, subsequently, the called line's number, which it can translate for the purpose of routing the call through the exchange.

In order to ensure that the counting of dial impulses by a register is not disrupted by response of the register due to the aforesaid correspondence being found between junction identities during the first parts of scan periods in successive scanning cycles of the scanner SC, an inhibit signal is present on a count inhibit lead *ci* extending from the scanner to the register, such as the register REG, during the first part of each scan period to render any response of the register ineffective to operate the dial impulse counting arrangement, but the inhibit signal is removed during the second part of each scan period under the control of the timing and sequencing elements of the scanner SC.

The electronic scanner SC is also connected with dummy registers, such as the dummy register DREG, which are busied to the register allotter AL until all the registers have been taken into use. This is conveniently achieved by means of a gating circuit arrangement, which will be fully described later with reference to FIG. 5 of the drawings. The purpose of these dummy registers is to register the identity of a calling incoming junction in the event of all normal registers being engaged so that busy tone can be returned over the calling incoming junction and at the same time the incoming junction loop may be disconnected at the incoming junction circuit on which the junction is terminated. In this way, call failure after dialling into the exchange over an incoming junction is avoided. It is contemplated that in the interests of security and for dealing with heavy traffic conditions at least two and possibly three dummy registers will be provided. Also for reasons of security, the gating circuit arrangement GC (FIG. 1) is duplicated and for security against failure of the system in the event of a fault in the electronic scanner SC or in the register allotter AL, the scanner and allotter are duplicated with change-over switching means being provided for operation to effect change-over at suitable intervals (i.e. every sixteen minutes) from one scanner to the other and from one register allotter to the other. If a fault develops on one of the scanners or register allotters, then the faulty scanner or allotter, as the case may be, will be switched out of service so that the healthy scanner or allotter is left in continuous operation until the faulty equipment has been restored to service. Still further on this matter of affording security against failure of the system, the comparator elements in each of the registers, including the dummy registers, are duplicated so that any malfunctioning of a comparator element will not prevent normal operation of the register containing the faulty comparator element and at the same time the comparator elements are arranged to prevent D.C. coupling between the registers and the scanner so that D.C. faults occurring on the scanner or on the registers cannot be extended through the comparator elements.

Referring now to the detail circuit diagram of FIG. 2 of the drawings, this shows in detail the gating circuit GC of FIG. 1.

The gating circuit GC includes ten groups of incoming junction gates I/CJG1 to I/CJG10 each group comprising forty pulse plus bias gates, such as the gates G1 to G40 of the group I/CJG1. The bias inputs of the four hundred pulse plus bias gates in the gating circuit GC are connected over call leads *cl*1 to *cl*400 to respective incoming junction circuits, such as the junction circuit I/CJC (FIG.

1) terminating incoming junctions connected to the exchange.

Each of the groups of pulse plus bias gates, as for example the group I/CJG1, is divided into ten sub-groups comprising four pulse plus bias gates by interconnecting the pulse inputs of the four gates, such as the gates G1 to G4 in the group I/CJG1. The pulse outputs of corresponding gates of each sub-group of a group, such as the group I/CJG1, are connected to respective pulse highways *ph*1 to *ph*4 (see also FIG. 1) through inverters associated with a group of incoming junction gates, such as the inverters NV1 to NV4, associated with the group I/CJG1. The pulse highways *ph*1 to *ph*4 extend to the electronic scanner SC, to be described later with reference to FIG. 3. The interconnected pulse inputs of the sub-grouped incoming junction gates are arranged for receiving over scan leads *sxl*1 to *sxl*100 scan pulses derived from gating circuits GS1 to GS10 each comprising ten AND gates, such as the AND gates GA1 to GA10 in the case of gating circuit GS1, and capable of combining two one-out-of-ten pulse markings from the electronic scanner SC into a one-out-of-one hundred pulse marking. The gating circuits GS1 to GS10 receive the two one-out-of-ten pulse markings from the electronic scanner SC over respective sets of scan leads *scl*1 to *scl*10 and *scl'*1 to *scl'*10.

Turning now to FIG. 3 of the drawings, the electronic scanner SC (FIG. 1) comprises three counters designated generally AC, BC and CC. The counter CC consists of four cascaded transistor bistable circuits BS1 to BS4 (including pulse-plus-bias gates) having a modified count of ten and driven from a multi-vibrator MV for controlling the operation of the scanner SC. On completion of each cycle count of ten made by the counter CC, an output derived from the last bistable circuit BS4 steps the counter BC which also comprises four transistor bistable circuits BS5 to BS8 having a count of ten. The two counters CC and BC accordingly provide between them a cyclic count of one hundred (i.e. the number of sub-groups of incoming junction gates). The other counter AC comprises a pair of transistor bistable circuits BS9 and BS10 having a natural count of four and arranged to be stepped by an output from the bistable circuit BS8 of the counter BC for each count of ten by the counter BC or for each count of one hundred made by the counter CC. The counters AC, BC and CC provide between them a maximum count of four hundred. The bistable circuits of the counter CC apply binary markings to the leads *l*1 to *l*8 through inverters NV5 to NV12. These binary markings are converted into decimal form by means of a strapping field SF1 and ten AND gates GA11 to GA20. One-out-of-ten markings will thus be applied through the gates GA11 to GA20, and respective inverters, to the scanning leads *scl*1 to *scl*10 in response to stepping of the binary counters CC. One of the scanning leads *scl*1 to *scl*10 accordingly has a scanning pulse applied to it for each count position of the counter CC. In the case of the similar counter BC driven from the counter CC, binary markings are applied from bistable circuits BS5 to BS8 to leads *l*9 to *l*16 via inverters NV13 to NV20. A strapping field SF2 and associated AND gates GA21 to GA30 serve to convert the binary markings from the counter BC into a one-out-of-ten marking on the scanning leads *scl'*1 to *scl'*10. In the same way as the binary counter CC extends a scanning pulse to one of the leads *scl*1 to *scl*10 for each of its count positions, the counter BC likewise extends a scanning pulse to one of the scanning leads *scl'*1 to *scl'*10 for each count position of the counter BC. The counters CC and BC together constitute one of the aforesaid parts of the composite scanner counter. As regards the binary counter AC, this constitutes the other part of the aforesaid parts of the composite counter. The outputs from bistable circuits BS9 and BS10 of the counter AC are fed to leads *l*17 to *l*20 through inverters NV21 to NV24 and thence to a strapping field SF3 which provides, in conjunction with four AND gates GA31 to GA34, one-out-of-four markings to inputs of four OR gates GO1 to GO4 as the counter AC steps from one count position to another. The outputs from the gates GO1 to GO4 are taken, respectively, to junction gate group scanning leads *sgl*1 to *sgl*4. Other inputs to the OR gates GO1 to GO4 are connected in common over a pulse lead *l*21 to the timing and sequencing section of the scanner SC to be described later. Outputs from the OR gates GO1 to GO4 applied to group scanning leads *sgl*1 to *sgl*4 are fed to the inputs of four AND gates GA35 to GA38 having other inputs thereof connected to the pulse highways *ph*1 to *ph*4.

As thus far described one of the scanning leads *sxl*1 to *sxl*100 (FIG. 2) will have a positive pulse applied to it each time the composite counter of the scanner steps from one count position to the next. Such positive pulse is applied to the commoned pulse inputs of one sub-group of incoming junction gates, as for example the sub-group defined by the gates G1 to G4 of the group I/CJG1. If any of the gates G1 to G4, say, is biased open as a result of the associated incoming junction being looped (signifying a new call or dialling on the junction) so that the incoming junction circuit extends positive potential to the bias input of the junction gate in question, then the scanning pulse applied to the commoned pulse inputs of gates G1 to G4 will pass through the opened gate and, after inversion, will pass on to one of the pulse highways *ph*1 to *ph*4. Consequently, if all four gates, such as the gates G1 to G4, were open, all four pulse highways would receive negative pulses from these gates. It will be appreciated, therefore, that the scanner counters CC and BC serve jointly for effecting scanning of a sub-group of four incoming junction gates corresponding to a group of incoming junctions. Scanning of an individual incoming junction gate corresponding to an individual incoming junction is provided by the counter AC. This counted in each of its count positions applies a scanning pulse to one of the leads *sgl*1 to *sgl*4, assuming of course that the counter AC is not rendered ineffective by the application of gate opening signals to inputs of the OR gates GO1 to GO4, with the result that scanning pulses would be applied to all of the leads *sgl*1 to *sgl*4. However, making this assumption that a scanning pulse will be applied to one of the leads *sgl*1 to *sgl*4, then the appropriate gate of the highway gates GA35 to GA38 will be primed and such gate will be opened if a negative pulse is applied to its other input from the appropriate pulse highway signifying that the appertaining incoming junction gate is in the open condition and that the incoming junction is looped. This scanning action takes place during the first part of the scan period of each count position of the composite scanner counter. During the second part of the scan period, all four of the incoming junction gates of the sub-group being scanned by the scanner counters CC and BC in conjunction are scanned for the purpose of supervising dialling by arranging that all four of the pulse highway gates GA35 to GA38 are primed by opening all of the OR gates GO1 to GO4 from the timing and sequencing section of the scanner SC driven from the multi-vibrator MV. Thus, during the first and second parts of the scanning period, a negative pulse on any of the highways *ph*1 to *ph*4 will open any associated gate which is primed and this gate will apply an appropriate marking on one of the extensions of the pulse highways indicated at *ph'*1 to *ph'*4. Each of these pulse highway extensions is connected to an input of an OR gate GO5 which will open to provide an output if any of the gates GA35 to GA38 is open. Thus, opening of the gate GO5 signifies that an individual incoming junction or at least one of a group of incoming junctions being scanned is in the looped condition. The output from the gate GO5 in its open condition is taken, after inversion, to the timing and sequencing section of the scanner over a lead *l*22. It is this inverted output from the gate GO5 which permits a free register to be taken into use for a new call by the transmission of a seize signal to the register from the scanner SC over the call answer lead *ca* (see also FIG. 1).

The wires of the binary to decimal strapping fields SF1 and SF2 are connected to inputs of respective groups of AND gates GA39 to GA46 and GA47 to GA54. The other inputs to these gates are connected in common over a lead *l*23 to the scanner timing and sequencing section The gates GA39 to GA46 have their output sides connected via amplifiers AM1 to AM8 to leads *id*1 to *id*8 extending in common to all the registers (see lead *id* in FIG. 1. The gates GA47 to GA54 have their output sides connected via amplifiers AM9 to AM16 to leads *id'*1 to *id'*8 also extending to the registers in common (see lead *id'* in FIG. 1).

Accordingly it will be apparent that by applying an appropriate pulse to the common inputs of the groups of gates GA39 to GA54 over lead *l*23 gates in the two groups will be opened in accordance with the count position or operating pattern of the bistable circuits of the two counters CC and BC to apply markings corresponding to the count position of these counters to the respective groups of leads *id*1 to *id*8 and *id'*1 to *id'*8.

The extensions of the pulse highways, namely *ph'*1 to ph'4, are connected via amplifiers AM17 to AM20 to respective leads *id''*1 to *id''*4 extending to all the registers in common (see lead *id''* in FIG. 1). It will be appreciated, therefore, that markings applied to the sets of leads *id*1 and *id*8 and *id'*1 and *id'*8 identify to the registers a particular group of incoming junctions (i.e. corresponding to a sub-group of junction gates), whereas each marking on the set of leads *id''*1 to *id''*4 identifies to the registers that one of the junctions of the group identified over leads *id*1 to *id*8 and *id'*1 to *id'*8 is in the looped condition.

Before describing with reference to FIG. 4 of the accompanying drawings, the operation of comparator elements in the registers, such as the register REG, it may here be mentioned that each of the leads *id*1 to *id*8 is effectively associated with a particular section of a bistable circuit (i.e. A or B section) in the counter CC and thus the condition of the bistable circuit section will be signified by the condition of the *id* lead when a gate priming pulse is applied to the lead *l*23 from the timing and sequencing section of the scanner. In this connection, if the transistor of the associated bistable circuit section is conducting, then a positive pulse will be applied to the particular *id* lead when the lead *l*23 is pulsed as aforesaid. The leads *id'*1 to *id'*8 are likewise associated with the various sections of the bistable circuits constituting the counter BC and once again the positive pulses will be applied to these leads consequent upon the pulsing of the lead *l*23 if the associated bistable circuit sections are in a conducting condition. The comparator elements in effect serve for comparing the electrical condition of the leads *id*1 to *id*8 and *id'*1 to *id'*8, as well as the electrical condition of the leads *id''*1 to *id''*4, with the electrical condition of corresponding leads extending from the outputs of the A and B sections of bistable circuits of register stores for storing the identity of a calling incoming junction. These stores and comparator elements will be described later.

At this point, it is convenient to turn to the timing and sequencing section of the scanner SC. This section comprises a multivibrator MV (20 kc./s.) which provides for a total scan period of fifty microseconds divided into two parts. The output from the multivibrator MV is applied to the normally open pulse plus bias gate of a monostable circuit MON1 which, when triggered, is restored to its stable condition six microseconds later. Thus, starting from the beginning of one complete cycle of the multivibrator, the monostable circuit MON1 will be immediately triggered by the positive going leading edge of the inverted output from the multivibrator MV. After six microseconds have elapsed, the monostable circuit MON1 restores to its normal condition. The positive output from the monostable circuit is inverted by an inverter NV25 and applied to one input of an AND gate GA55. A further negative input to the gate GA55 is derived through an inverter NV26 and consequently the gate GA55 is opened to provide a positive pulse output which is applied over a lead *l*24 to the pulse input of the pulse plus bias gates associated with the A and B sections of the bistable circuit BS1 to step the composite scanner counter to its next count position. Also at the beginning of the cycle of the multivibrator MV, a further monostable circuit MON2 having a delay time of fifteen microseconds is triggered. After the elapse of this time delay, the monostable circuit MON2 restores to its stable condition, whereupon a positive pulse output from the circuit, after inversion by an inverter NV27 and amplification of an amplifier AM21, is applied to the lead *l*23 to enable markings corresponding to the count positions of the counters CC and BC to be gated out to the registers over the sets of leads *id*1 to *id*8 and *id'*1 to *id'*8 for consideration by the comparator elements of the registers.

The negative output derived from the output side of the inverter NV27 is reinverted by an inverter NV28 and applied to the bias input of a pulse plus bias gate associated with the A section of a bistable circuit BS11 for controlling the group of OR gates GO1 to GO4. This pulse plus bias gate is accordingly biased open so that the bistable circuit BS11 is conditioned ready for being turned over so that the B section transistor conducts when a positive pulse is applied to the pulse input of the pulse plus bias gate later in the scan period of the electronic scanner.

Consequent upon the restoration of the monostable circuit MON2 to its stable condition (i.e. after fifteen microseconds from the commencement of the scan period) the positive pulse derived from the circuit is applied to the pulse input of the pulse plus bias gate of a further monostable circuit MON3 having a time delay period of fifteen microseconds and serves for triggering this circuit. When the monostable circuit MON3 restores after thirty microseconds from the commencement of the multivibrator cycle or scan period, a positive pulse is applied in common to the pulse inputs of biased open pulse-plus-bias gates of two further monostable circuits MON4 and MON5 having time delay periods of six microseconds and fifteen microseconds, respectively. The monostable circuit MON5, as it is operated, causes a priming negative potential from an inverter NV29 to be removed from one input of an AND gate GA56.

If, when the scanner SC (FIG. 1) extended the markings identifying the particular group of junctions to the registers over the leads *id*1 to *id*8 and *id'*1 to *id'*8 in response to the opening of gates of the groups GA39 to GA46 and GA47 to GA54 by the potential derived over the lead *l*23 (i.e. after fifteen microseconds from the beginning of the scan period), one of the pulse highway extensions *ph*1 to *ph*4 is marked signifying the looped condition of the particular incoming junction of the group of junctions being scanned and none of the registers has the identity of the looped incoming junction stored within it, then negative potential is applied to the new call lead *nc*. At this time, the monostable circuit MON5 will not yet have been operated, as a consequence of which the gate GA56 will be opened by the negative potential applied to both of its inputs and the positive pulse output from this gate is applied to the pulse input of the pulse-plus-bias gate of a monostable circuit MON6 having a time delay period of six microseconds. Since the OR gate GO5 associated with the pulse highway extensions is opened at this instant in the scan period due to the marking on one of the pulse highway extensions, the pulse-plus-bias gate of the monostable circuit MON6 will be biased open. Consequently, the monostable circuit MON6 will be operated and the negative output from the circuit is applied, after amplification by an amplifier AM22, to the call answer lead *ca* in order to seize a free register allocated by the register allotter AL for dealing with the new call initiated on the incoming junction being scanned at that instant. After the expiration of six microseconds, the monostable circuit MON6 restores to remove the negative register seize potential from the call answer lead *ca*. Reverting now to the monostable circuit MON4, it will be observed that this circuit is triggered, together with the circuit MON5, by the positive pulse derived from the output of monostable circuit MON3 when it restores. Since the monostable circuit MON4 has a time delay period of six microseconds which corresponds to the delay period of the monostable circuit MON6 which in turn operates simultaneously with the monostable circuit MON5 when an output is derived from the gate GA56, then the bistable circuit BS11 will be operated by the positive pulse output derived from the monostable circuit MON4 as it restores at the same time as the negative register seize potential is removed from the call answer lead *ca*. As the bistable circuit operates so that the B section of the circuit provides a positive output on lead *l*21, the OR gates GO1 to GO4 are all opened, thereby rendering the counter AC ineffective. This marks the beginning of the second part of the scan period of the scanner SC, the scanner counter having been set and a free register having been seized, if necessary, during the first part of the scan period.

Also during the second part of the scan period, dial impulse counting sections of the registers are rendered operative by the application of negative potential to the inhibit lead *ci* for a period of six microseconds following the priming of the pulse highway gates GA35 to GA38. This is achieved by the operation of yet another monostable circuit MON7 after forty-five microseconds of the scan period have elapsed (i.e. the combined delay periods of monostable circuits MON2, MON3 and MON5).

Turning now to FIG. 4 of the drawings, this shows part of one of the registers REG. As has previously been mentioned, the register comprises stores for recording the identity of a calling incoming junction. These stores are defined by three groups of bistable circuits. The first of these groups consists of four transistor bistable circuits BS12 to BS15 which correspond, respectively, to the bistable circuits BS1 to BS4 of the scanner counter CC. A second group of bistable circuits BS16 to BS19 is associated with the scanner counter BC so that the bistable circuits BS16 to BS19 correspond to the counter bistable circuits BS5 to BS8. A third group comprises four bistable circuits BS20 to BS23 which are associated, respectively, with the pulse highways *ph*1 to *ph*4.

The leads *id*1 to *id*8 are connected to the pulse inputs of respective pulse plus bias gates G41 to G48 having their bias inputs connected to the outputs from the A and B sections of the bistable circuits BS12 to BS15. The leads *id'*1 to *id'*8 are also connected to the pulse inputs of pulse plus bias gates G49 to G56 which have their bias inputs connected to the outputs from the A and B sections of the bistable circuits BS16 to BS19. In addition, the leads *id"*1 to *id"*4 are connected to the pulse inputs of pulse plus bias gates G57 to G60. The bias inputs of these gates G57 to G60 are connected to outputs from the B sections only of the bistable circuits BS20 to BS23.

The pulse plus bias gates G41 to G56 are associated, respectively, with corresponding sections (i.e. A or B section) of corresponding bistable circuits in the register stores and the scanner counters CC and BC. These pulse plus bias gates serve as comparator elements for comparing the identity of a particular sub-group of incoming junctions or group of junctions passed to the register from the scanner SC over the sets of leads *id*1 to *id*8 and *id'*1 to *id'*8, with the incoming junction sub-group identities already stored within the registers.

The operation of the comparator elements is fully described in United States application No. 353,861. For the purpose of understanding the operation of the present embodiment, it is sufficient to mention that if the conditions of the bistable circuits of the register store defined by the bistable circuits BS12 to BS15 correspond with those of the associated bistable circuits of the scanner counter CC, then one or other of each pair of pulse plus bias gates, such as the pair of gates G41 and G42, will provide a positive output pulse. The positive output pulses from the paired gates are applied to respective pulse inputs of an AND gate GA57 to provide an output from this gate. If, however, there is lack of correspondence between the conditions of corresponding bistable circuits, then neither of the gates of at least one pair of gates, such as the gates G41 and G42 associated with the bistable circuit BS15, will open to provide a pulse at least preparing the opening of gate GA57. As regards gates G49 to G56, these have likewise associated with them an AND gate GA58 which opens to provide an output only when the conditions of the bistable circuits of the scanner counter BC are the same as those of the corresponding bistable circuits in the register store comprising bistable circuits BS16 to BS19.

In the case of the other register store comprising bistable circuits BS20 to BS23, the gates G57 to G60 compare a marking on the leads *id"*1 to *id"*4 with the conditions of the bistable circuits. If there is correspondence, then one of the gates G57 to G60 will provide an output which, after inversion by an inverter NV30, is applied, together with the outputs from the AND gates GA57 and GA58 (assuming complete conformity between marked and stored incoming junction identities), to the respective inputs of a further AND gate GA59. The outputs from the gates GA57 and GA58 are also fed to respective inputs of a further AND gate GA60 having another input which is connected via an OR gate GO6 to the inhibit lead *ci*. It may be mentioned at this point that the lead *ci*(*d*) and the other leads having the suffix (*d*), as for instance the leads *nc*(*d*) and *ca*(*d*), extend to another electronic scanner identical to the scanner SC, already described with reference to FIG. 3 of the drawings. The other scanner will be arranged to be brought into service alternately with the scanner SC of FIG. 3 by suitable change-over switching means (not shown) as previously discussed.

Reverting to the description of the scanner SC, it will be recollected that negative potential is required to be present on the new call ask lead *ca* if a register is to be seized for a new call. However, if correspondence, as just above described, is found signifying that a register, such as the register REG, has already been taken into use for a new call, then the gate GA59 will be opened to provide an output which, after inversion by an inverter NV36, provides a positive potential on the new call lead *nc* which prevents opening of the gate GA56 (FIG. 3) already primed by the output from the monostable circuit MON5 in its unoperated condition during the first part of the scan period.

Assuming for the moment that the identity of a looped incoming junction being scanned has not been stored in any of the registers, then it will be remembered that a negative register seize signal is applied to the call answer lead *ca* from the scanner SC during the first part of the scan period. This seize signal is applied to one of the inputs of an OR gate GO7, the output of which is connected to one of the inputs of an AND gate GA61. The other input to the gate GA61 is coupled via an inverter NV32 to the output of an OR gate GO8. The OR gate GO8 has two inputs which are connected, respectively, to test/allot leads *ta* and *ta*(*d*) of two register allotters, such as the register allotter AL (FIG. 1), which are arranged to be brought into service alternately under the control of change-over switching means as previously discussed. Each of these register allotters comprises a one-only selector and for the purpose of selecting a free register, such as the register REG, earth potential is removed from the lead *ta* or *ta*(*d*) and replaced by negative potential derived from inverter NV34 or NV35. All other registers will have earth potential applied to their individual test/allot leads. For the purpose of selecting a free register, the conditions of all the registers (i.e. free or busy) are signified to the allotter over the test/allot leads. Considering the register REG, a busy/free bistable circuit BS24 has the transistor of its A section conducting when the register is in a free condition. Accordingly, positive potential derived through an inverter NV33 from the B section output of the bistable circuit BS24 is applied to the emitter of a transistor of a gate GT1. The base of the transistor of this gate is connected to a fuse alarm lead *fa* to which negative potential is applied if the register fuses (i.e. fuses associated with the D.C. section of the register comprising dial impulse counting means and called line's number stores) are intact. The transistor of the gate GT1 accordingly conducts and the positive output from the collector of the transistor is fed to two inverters NV34 and NV35 connected in parallel paths. The negative output from these inverters is fed to the test/allot leads *ta* and *ta*(*d*) to indicate that the register is free and, moreover, that the register fuses as aforesaid are healthy, since negative potential will only be present on the fuse alarm lead *fa*, thereby enabling the transistor of the gate GT1 to conduct for signifying the free condition of the register, if all the register fuses are intact. The negative potential on the lead *ta* or *ta*(*d*) opens the OR gate GO8, the output of which, after inversion by the inverter NV32, provides the second input to the gate GA61. Thus, this gate GA61 in the particular register allocated by the allotter AL will open in response to the register seize signal appearing on the lead *ca* of the register. When the gate GA61 opens, a positive pulse output from it causes the busy/free bistable circuit BS24 to turn over (i.e. the B section transistor conducts) as a consequence of which negative potential is now applied to the emitter of the transistor of the gate GT1 and positive potential is accordingly applied to the leads *ta* and *ta*(*d*) to busy the register to the allotter. At the same time, the positive pulse output from the gate GA61 is applied to the commoned pulse inputs of the pulse plus bias gates associated with the A sections of the transistor bistable circuits BS12 to BS23 to cause these circuits to be set in accordance with the markings appearing on the leads *id*1 to *id*8, *id'*1 to *id'*8 and *id''*1 to *id''*4 which the register comparator elements have previously compared with stored incoming junction idenitities and failed to find any correspondence. Upon setting the bistable circuits in question, the gates GA57, GA58 and GA59 are opened and positive potential is accordingly applied to the new call ask lead *nc* through an inverter NV36 to prevent a further register from being taken into use for handling the call during the next scan cycle.

The storage of the calling incoming junction identity in the appropriate register stores is completed during the first part of the scan period in question. During the second part of this scan period, supervision of dialling is effected as follows.

As will be recalled, the pulse highway gates GA35 to GA38 are all primed in response to the operation of the bistable circuit BS11 in the scanner SC during the second part of the scan period so as to effect scanning of the four incoming junctions appertaining to the sub-group of incoming junction gates, such as the gates G1 to G4, in the gating circuit GC being scanned by the scanner counters BC and CC. If any of these junctions are in a looped condition, then appropriate markings appear on the leads *id''*1 to *id''*4 extending to all of the registers in common. The gates GA57 and GA58 of the register REG which has been taken into use will be open. If the calling incoming junction for which the particular register REG has been taken into use is found to be looped, the negative potential obtained from the inverter NV30 will be applied to an inverter NV37 whose positive output is fed to one of the inputs of an AND gate GA79 to inhibit this gate and is also fed to the emitter of a transistor gate GT2. As previously mentioned, the gate GA60 has one of its inputs connected to the inhibit lead *ci* extending from the electronic scanner SC and negative potential will be applied to this lead during the second part of the scan period, more specifically after the elapse of forty-five microseconds of the scan period. The gate GA60 accordingly opens and the positive output from this gate is inverted by an inverter NV38, the negative output from which is applied to the second input of the gate GA79 and to the base of the transistor of the gate GT2. The gate GA79 remains closed, but the transistor of the gate GT2 accordingly conducts to provide a positive output which is fed to the pulse input of the pulse plus bias gate associated with the normally conducting A section of a bistable circuit BS25 so as to operate this bistable circuit and thereby cause the B section of the circuit to conduct. The positive output from the B section of the bistable circuit BS25, after inversion by an inverter NV39, is applied to one of a pair of dial impulse count leads *dic*1 and *dic*2 extending into the dial impulse counting and storage section (not shown) of the register REG. The dial impulse count lead *dic*2 is connected to the output of the A section of the bistable circuit BS25 via an inverter NV40.

If the particular calling incoming junction, the identity of which is stored within the register REG, is found not to be in the looped condition when scanned during the second part of the scan period, then the gate GA79 will be opened by negative outputs from the inverters NV37 and NV38. The gate GT2, however, will be closed due to the negative outputs from the inverters NV37 and NV38. The positive pulse output from the gate GA79 will be applied to the B section of the bistable circuit BS25, the condition of which remains unchanged assuming that the A section of the bistable circuit is conducting.

The procedure for the supervision of dialling on the calling incoming junction, for which the register REG has been taken into use, is the same during the second parts of subsequent scan periods. The potential appearing on the dial impulse count lead *dic*2 each time the bistable circuit BS25 is operated from its A section conducting condition to its B section conducting condition indicates to the dial impulse counting and storage section of the register that a disconnection on the calling incoming junction has been replaced by a loop. Consequently, by providing a dial impulse scan time which is shorter than the duration of a dial loop impulse as previously discussed, the bistable circuit BS25 is operated a number of times corresponding to the number of dial loop impulses received over the calling incoming junction.

After receiving and storing at least some of the dialled digits for identifying the called line's number, the D.C. section of the register causes the register REG to extend the identity of the calling incoming junction stored within it to the translator TR (FIG. 1) for the purpose of routing the call through the exchange. Before this identity can be passed to the translator TR, the D.C. section of the register REG must apply to and receive a signal back from the translator coupler TC over lead *tx*.

The translator in the present embodiment requires this information identifying the calling incoming junction to be in the form of three two-out-of-five markings. In order to furnish these markings, the outputs from the respective sections of bistable circuits BS12 to BS15 are connected over leads *l*25 to *l*32 to a strapping field SF4 having ten emitter inhibit AND gates GT3 to GT12 associated with it. The strapping field SF4 and associated gates GT3 to GT12 serve for converting the binary marking emanating from the group of bistable circuits BS12 to BS15 to a one-out-of-ten marking and in order to convert this marking into a two-out-of-five marking the outputs of the gates GT3 to GT12 are connected with the wires of a strapping field SF5 having five leads *trl*1 to *trl*5 associated with it. This provides the first of the three two-out-of-five markings required by the translator TR.

The binary marking applied to leads $l33$ to $l40$ from the bistable circuits BS16 to BS19 is applied to a strapping field SF6 having gates GT13 to GT22 associated with it. In this way, the binary marking is converted to a one-out-of-ten marking which is then converted into a two-out-of-five marking to the leads $trl'1$ to $trl'5$ by connecting the outputs of the gates GT13 to GT22 to particular wires of a strapping field SF7. This provides the second of the three two-out-of-five markings for the translator. The third two-out-of-five marking is derived from the one-out-of-four marking provided by the bistable circuits BS20 to BS23. This one-out-of-four marking is applied to leads $l41$ to $l44$ and for the purpose of converting this marking to a two-out-of-five marking the leads $l41$ to $l44$ are connected to the inputs of four gates GT23 to GT26 each having two outputs connected to respective wires of a strapping field SF8 which has a group of five leads $trl''1$ to $trl''5$ connected to strapping field wires.

From the foregoing, it will be seen that three two-out-of-five markings can be extended to the translator TR over the leads $trl1$ to $trl5$, $trl'1$ to $trl'5$ and $trl''1$ to $trl''5$. Such extension of markings can only take place if earth potential is applied to the commoned emitters of the transistors of the gates GT3 to GT26 over a lead $l45$. Such earth potential is arranged to be applied to lead $l45$ from an identity ask lead *ia* in the D.C. section of the register when it is required to transmit junction identity markings to the translator TR from the register REG.

It may here be mentioned that the principle of exchange sectionalisation as fully described in United States Patent No. 3,272,924 may be applied to the exchange of which the incoming junction scanning arrangement of the present invention forms part. As is described in the copending application just above referred to, economies in switching equipment can be realised by the sectionalisation of the exchange switching equipment and still further economies can be achieved by dividing each of the exchange sections into a number of units. In the case of the present embodiment, it has been assumed that each of the exchange sections has five units each dealing with a proportion of the total lines connected to the exchange. For the purpose of identifying the particular unit in which the incoming junctions are connected, a unit identity marking is arranged to be applied to the translator TR over unit identity leads $ui1$ to $ui5$. This marking which is also a two-out-of-five marking is derived from two inverters NV41 and NV42 which have their outputs strapped to two of the unit identity leads $ui1$ to $ui5$ and provide negative outputs when earth potential is applied to the identity ask lead *ia* from the D.C. section of the register REG.

The called line's number which will be stored in the dial impulse counting and storage section of the register REG will also be passed to the translator TR to enable a routing choice to be made. When all the information concerning the calling incoming junction and called line's number has been passed to the translator TR and a route set up through the exchange, the register REG will need to be released for use in connection with a further incoming call. When the call route has been set up, the particular pulse-plus-bias incoming junction gate, as for example the gate G1 (FIG. 2*a*) pertaining to the calling incoming junction will have the positive potential removed from its bias input in order to close the gate. The D.C. section of the register REG accordingly applies a positive potential to a register reset lead *rr* to bias open the pulse-plus-bias gate associated with the B section of bistable circuit BS24. When the OR gate GO6 closes (i.e. the next time the monostable circuit MON7 in the scanner timing and sequencing section returns to its stable condition after operation thereof) a positive pulse output is obtained from the gate GO6 and this passes to the pulse input of the pulse-plus-bias gate associated with the B section of the busy/free bistable circuit BS24. The bistable circuit is restored to its normal condition (i.e. the A section transistor conducting) and the positive pulse output from the inverter NV33 is applied to the commoned pulse inputs of the pulse-plus-bias gates associated with the B sections of the bistable circuits BS 12 to BS23, as a consequence of which those bistable circuits which were set when the register REG was initially seized are reset to their normal conditions. In much the same way, stores provided in the D.C. section of the register for storing the identity of the called line's number will be likewise reset to their normal condition. The gate GT1 is opened by the positive potential applied to the emitter connection of this gate which feeds an output to the inverters NV34 and NV35 (assuming all register fuses are intact) and the negative outputs from these inverters indicate the register as free to the operative register allotter over the lead *ta* or *ta*(*d*), as appropriate.

As has been mentioned previously, provision may be made for avoiding call failure in the event of all the normal registers being engaged. This is achieved by providing a number of dummy registers which come into operation only when all the other registers have been taken into use and serve for returning busy tone back over incoming junctions on which new calls are initiated and in respect of which the dummy registers are taken into use. In this connection, reference will now be made to FIG. 5 of the drawings which shows part of a dummy register, as for example the dummy register DREG (FIG. 1), which differentiates it from a normal register, such as the register REG.

Referring now to FIG. 5 of the drawings, this shows part of the dummy register DREG. The other part of the dummy register may conveniently be identical to that part of the normal register REG (FIG. 4) shown to the right of the vertical dashed line. The circuit diagram of the complete dummy register may therefore be obtained by lining up the dashed line in FIG. 5 with the dashed line in FIG. 4. Similar designations are employed for corresponding leads in the register REG and the dummy register DREG. The new call ask lead *nc*, the call answer lead *ca*, the inhibit lead *ci* and the test/allot lead *ta* will, in practice, be duplicated as in FIG. 4.

The registers, such as the register REG shown in FIG. 4, have the outputs from inverters, such as the inverters corresponding to the inverter NV33 connected with the busy/free bistable circuits, as for example the circuit BS24 in FIG. 4, coupled to respective leads of a group of register busy/free leads $bf1$ to $bf50$. This assumes that the exchange will be equipped with fifty registers, such as the register REG. From a consideration of FIG. 4, it will be seen that as the registers are seized the outputs from the inverters corresponding to the inverter NV33 become negative. Consequently, the negative output is applied to leads of the group $bf1$ to $bf50$ as the associated registers are taken into use. The leads $bf1$ to $bf50$ are divided into ten sub-groups of five leads each, such as the sub-group $bf1$ to $bf5$ and these sub-groups are respectively connected to the inputs of ten AND gates GA62 to GA71. The outputs from the gates GA62 to GA66 are connected to the inputs of an AND gate GA72, while the outputs from the gates GA67 to GA71 are connected to the inputs of an AND gate GA73. The outputs from the two gates GA72 and GA73 are taken to the inputs of a further AND gate GA74. The arrangement of the associated gates GA62 to GA74 is such that the gate GA74 is opened only when negative potential is applied to all of the register busy/free leads $bf1$ to $bf50$, that is to say when all the normal registers are engaged. An AND gate GA75 is primed by the output from the opened gate GA74 so that the gate GA75 will be opened by an appropriate output applied to the lead *ci* from the monostable circuit MON7 in the electronic scanner SC. When the gate GA75 opens, a positive pulse output is applied to the pulse input of the bias opened pulse-plus-bias gate of the A section of a bistable circuit BS26. Since the transistor in the A section of the circuit will be normally conducting, the bistable circuit is operated so that the B section transistor is rendered conducting to provide a positive output from its collector which biases open the pulse-plus-bias gate of the B section. The negative output from the A section transistor opens an AND gate GA76 which derives its other negative input from the B section of a busy/free bistable circuit BS27 if the dummy register DREG is free. The gate GA76, in opening, causes a negative potential to be applied to the test/allot lead *ta* from an inverter NV43, thereby enabling the allotter to select the dummy register DREG for handling an incoming call.

If a new call has been initiated on a particular incoming junction being scanned by the scanner SC during the first part of a scan period and all of the registers are busy, then the dummy register DREG will be applying negative potential to the new call ask lead *nc* since the gate GA59 is closed. Consequently, the dummy register will be seized from the scanner SC by the application of a negative seize potential to the call answer lead *ca* during the first part of the scan period in the manner already described in connection with the seizure of a normal register, such as the register REG. The negative potential applied to the lead *ca*, in conjunction with the negative potential applied to the lead *ta* from the inverter NV43, opens an AND gate GA77. The positive pulse output from this gate is applied to the biased open pulse plus bias gate of the A section of the busy/free bistable circuit BS27, with the result that the latter circuit operates. The consequential positive output from the B section of the circuit is applied to one of the inputs of the gate GA76 to close this gate and thereby cause the negative potential to be removed from the test/allot lead *ta* so that the dummy register is busied to the allotter. The positive pulse output from the gate GA77 which operates the busy/free bistable circuit BS27 to its busy state is also applied to the commoned pulse inputs of the A sections of all the bistable circuits comprising the calling incoming junction identity stores in order to set these bistable circuits in accordance with the conditions of the scanner counters CC, BC and AC (FIG. 3). When these bistable circuits have been set, the gate GA59 (see also FIG. 4) will be operated and positive potential will be applied to the new call ask lead *nc* to prevent the seizure of a further register during a subsequent scan period.

The positive output from the B section of the busy/free bistable circuit BS27 is also applied through an inverter NV44 to a translator coupler (not shown) over a lead *tx* to indicate to the coupler that the translator TR is required to be coupled to the dummy register DREG to receive over leads corresponding to the leads *trl*1 to *trl*5, *trl'*1 to *trl'*5 and *trl''*1 to *trl''*5 (FIG. 4) the identity of the calling incoming junction for which the dummy register has been taken into use. The translator TR will then provide a translation of the identity received from the dummy register to enable busy tone to be fed back over the calling incoming junction in question. The negative output from the inverter NV44 is also applied to the input of an inverter NV45 and the resulting positive output, after amplification by an amplifier AM24, is applied via lead *l*45 to inverters corresponding to the inverters NV41 and NV42 in FIG. 4, as well as to the emitter connections of gates corresponding to the gates GT3 to GT26 in order to bring about the gating out of markings from the dummy register DREG to the translator TR for the purpose of identifying the calling incoming junction and the particular unit of the exchange to which this junction is connected.

When the busy/free bistable circuit BS27 was initially operated, the negative output from the A section of the circuit removed the inhibit from a multi-vibrator MVX providing an output signal (30 c./s.) which drives a four-stage counter RX comprising four cascaded transistor bistable circuits BS28 to BS31 having a natural count of sixteen. Consequently, the last bistable circuit of the counter RX, namely bistable circuit BS31, will be operated after the expiration of four hundred and eighty milliseconds (i.e. $30 \times 16$ milliseconds) from the time of seizure of the dummy register DREG. The bistable circuit BS31 thus provides a positive pulse output from its B section and this output is applied to the pulse input of the opened pulse plus bias gate of a monostable circuit MON8 having a time delay of ten microseconds. After the elapse of this time delay, the positive pulse output derived from the monostable circuit MON8 as it restores to its normal condition is applied to the pulse input of the opened pulse plus bias gate of the B section of the busy/free bistable circuit BS27 to restore this latter circuit to its normal condition, whereupon the multivibrator MVX is arrested by the positive potential applied to it from the A section of the bistable circuit BS27.

The calling incoming junction identity stores in the dummy register will be emptied by the resetting of operated bistable circuits of these stores responsively to the application of a positive pulse to the commoned pulse inputs of the pulse plus bias gates associated with the B sections of these bistable circuits from an inverter NV46 connected to the B section of the bistable circuit BS27. The gate GA76 is again opened by the negative potential applied to both of its inputs and the dummy register is indicated free to the allotter AL by the negative potential applied to the lead *ta*. This is assuming of course that the normal registers, such as the register REG, are all engaged at this juncture. If any of the normal registers have become free then at least one of the busy/free gates GA62 to GA71 will close and accordingly effect closure of the gate GA74. When the gate GA74 closes, the positive output from an inverter NV47 opens an AND gate GA78 in conjunction with positive potential applied to the inhibit lead *ci* from the monostable circuit MON7 of the scanner SC. The positive pulse output from the gate GA78 as it opens is fed to the pulse input of the opened pulse plus bias gate of the B section of the bistable circuit BS26. Accordingly the bistable circuit BS26 is restored to its normal condition and the positive output from its A section closes the gate GA76, whereupon the dummy register is busied to the register allotter AL over the test/allot lead *ta*. Busy tone is arranged to be fed back to the calling incoming junction by the operation of tone circuits (not shown) consequent upon the transmission of the junction identity markings from the dummy register DREG to the translator TR. When busy tone is applied to the incoming junction, the calling condition (i.e. loop condition) is removed for the appropriate incoming junction circuit from the bias input of the appertaining incoming junction pulse plus bias gate, as for example the gate G1, as a consequence of which the call cannot take another register into use. If, under fault conditions, this calling condition referred to is not removed from the incoming junction gate in question, then the bistable circuit BS25 will remain operated (i.e. the B section transistor of the bistable circuit BS25 is conducting). This is because the bistable circuit BS25 is initially operated by a loop condition found on the junction and the circuit will either remain in the operated condition, assuming that there is no disconnection of the junction as a result of break dial impulses, or the circuit will be returned to its operated condition from its restored condition (i.e. A section transistor conducting) at the end of a train of dial impulses received over the junction.

The positive output from the B section of the bistable circuit BS25 is applied to an alarm circuit which registers the fault signified by the failure of tone circuits to return busy tone back over the calling junction.

The tone circuits for supplying busy tone to calling incoming junctions in the event that all the normal registers have been taken into use may take any suitable form as may their manner of association with calling incoming junction circuits.

It is contemplated that at least two dummy registers will normally be provided in order to avoid call failure under heavy traffic conditions and in very large exchanges it may be necessary to provide more than two dummy registers for reasons of security. In the absence of a dummy register call failure could easily arise if all the registers are initially engaged when a call is initiated on one of the incoming junctions, but a register is later freed and seized by the calling incoming junction after dialing has commenced, with the result that the wrong called line's number will be stored in the D.C. section of the register in question. From the foregoing description of the dummy register with reference to FIG. 5 of the drawings, it will readily be appreciated that it is not necessary to provide a D.C. section including dial impulse counting and storage means in the dummy registers since the dummy registers are only required to store the identity of the calling incoming junctions for which they are taken into use to enable busy tone to be returned back over the junctions. Thus, all the registers have a section which is A.C. coupled to the scanner SC by pulse plus bias gates, such as the gates G41 and G42, whereby D.C. faults cannot be extended from registers to the scanner SC. In addition, the gates, such as the gates G41 and G42, are duplicated to enable registers to be used in conjunction with the alternative scanner in the event of a fault developing on one of the gates, such as the gate G41.

The D.C. sections of the registers may, if desired, be mounted remotely from the A.C. coupled sections which are of necessity mounted in close proximity to the scanner SC in order to keep the length of leads *id*1 to *id*8, *id'*1 to *id'*8 and *id''*1 to *id''*4 to a minimum.

It will be appreciated from the foregoing description that the scanning arrangement according to the invention enables the speed of the electronic scanner SC to be virtually quadrupled during the second part of a scan period of the scanner by arranging that a group of four incoming junctions are scanned simultaneously by rendering ineffective that part of the scanner constituted by the counter AC which selects, for scanning purposes, one out of the group of four junctions during the first part of the scan period. Thus, the necessity for providing a scanner having a considerably faster scanning speed than that provided by the scanner SC for the purpose of supervising dialling on calling incoming junction is avoided. At the same time, the registers are not required to identify to the scanner SC the identities of calling incoming junctions stored within the registers before the calling incoming junctions on which dialling is to be supervised can be scanned for dial pulses as necessitated in the particular scanning arrangement described in United States application No. 353,861, with the consequent possibility of wrong incoming junction identities being extended to the scanner SC from registers and the resulting registration of incorrect called lines' numbers in the registers.

If, when scanning of four junctions of the group occurs, dialling is taking place on at least one of these junctions, then a corresponding number of registers, such as the register REG, will have already been taken into use for the call or calls, as the case may be, and such register or registers only can respond to loop signals on the leads *id''*1 to *id''*4 since only these registers will have their gates GA60 opened due to correspondence between the identity of the junction being scanned and the identities of the junctions stored in the registers. Thus, the arrangement of the present invention provides in effect the scanning of a maximum of four registers during the second part of a scan period with a view to transmitting dialled information to the registers taken into use for calls on the junctions being scanned. However, there is no reason why the number of junctions in the group scanned during the second part of each scan period should be restricted to four provided that the junctions can be scanned for new calls every sixty milliseconds or less. In the embodiment described, the junctions are scanned for new calls every $400 \times 50\mu s = 20$ milliseconds. Consequently, the number of junctions in the group of junctions scanned during the second part of each scan period could be increased $(60/20) \times 4 = 12$.

It will be appreciated that the system described above with reference to the drawings may be modified without departing from the scope of the invention. For instance, the timing arrangement comprising the dummy register counter RX (FIG. 5) driven from the multivibrator MVX may be replaced by an alternative timing arrangement now to be described with reference to FIG. 8 of the drawings. Referring to FIG. 8, the arrangement derives input signals over leads *a* and *b* which will be connected, respectively, to the input and output of the inverter NV46 (FIG. 5) in the dummy register DREG. With the dummy register in the free condition, the lead *a* is held negative while the lead *b* is at earth potential. The earth potential on lead *b* is applied to an inhibit input of a multivibrator MVX' (having a frequency of 5 c./s.) which is accordingly cut-off and four transistor bistable circuits BS32 to BS35 of the timing arrangement having pulse-plus-bias gates associated with respective A and B sections of the bistable circuits are normally in a condition where the transistor of the A section is conducting.

When the dummy register is seized in the manner already described with reference to FIG. 5, the lead *a* is taken to earth potential, but at this point the conditions of the bistable circuits of the timing arrangement remain unchanged. The lead *b* is driven negative to bring the multivibrator MVX' into operation. A positive output is obtained immediately from an inverter NV48 which has its input connected to the output from the multivibrator MVX' and this positive output is applied to the pulse inputs of the pulse-plus-bias gates associated with bistable circuit BS32 to cause this bistable circuit to turn over so that the transistor of its B section is conducting. Thereafter, the bistable circuit BS32, together with the bistable circuit BS33 which is arranged to be driven from the output of the circuit BS32, act as a two-stage counter. Two gates, one of which is a so-called NOR gate indicated at GN1 and the other of which is an AND gate indicated at GA80, open and close depending upon the setting of the bistable circuits BS32 and BS33. Initially, both of these gates GN1 and GA80 are closed with the output of the gate GN1 being at earth potential and the output of the AND gate GA80 being at negative potential. The arrangement is such that, when the bistable circuit BS32 has the transistor of its B section conducting while the bistable circuit BS33 has the transistor of its A section conducting, the gate GN1 is opened so producing a negative pulse which for convenience will be referred to as an S pulse. A positive pulse which will be referred to as a K pulse is produced by the AND gate GA80 when both of the bistable circuits BS32 and BS33 have the transistors of their B sections conducting. The outputs from the gates GN1 and GA80 are applied to the pulse inputs of respective pulse-plus-bias gates associated with the A sections of the transistor bistable circuits BS34 and BS35, repectively. The inputs of the pulse-plus-bias gates of the bistable circuit BS34 are connected to outputs from the bistable circuit BS25 in the dummy register DREG (FIG. 5) such that an earth potential is applied to a lead *x* connected to the bias input of the pulse-plus-bias gate associated with the A section of the bistable circuit BS34. Negative potential is applied to a further lead *y* which is connected to the pulse input of the pulse-plus-bias gate associated with the B section of the bistable circuit BS34 when a disconnection is present in the incoming junction circuit for which the register is taken into use. These polarities are reversed when a loop is detected on the incoming junction concerned.

The operation of the timing arrangement is such that if a start signal is applied to the lead *b* to start the multivibrator MVX' into operation, the S pulse persists for 200 milliseconds. During this time, busy tone should be returned to the calling incoming junction and a disconnection detected by the dial path. Thus, at the end of the S pulse, when the output of the AND gate GA80 is at earth potential, the bistable circuit BS34 which is connected to the NOR gate GN1 turns over so that the transistor of the B section is conducting since the bias input of the pulse-plus-bias gate associated with the A section of the circuit has earth potential applied to it over lead *x*. The output from the B section of the transistor bistable circuit BS34 is at earth potential and is connected to the bias input of the bistable circuit BS35 which is connected to the AND gate. Consequently, the bistable circuit BS35 can turn over so that its B section transistor is conducting at the commencement of the K pulse. This K pulse is also inverted by an inverter NV49 and then applied to a reset lead *rrl* for the dummy register. A further AND gate GA81 having its inputs connected, respectively, to the output from the inverter NV49 and the output from the B section of the bistable circuit BS35 remains closed.

If busy tone is not returned to the incoming junction during the first period of 200 milliseconds, the lead *x* will remain at negative potential and the bistable circuit BS34 will therefore not turn over at the end of the S pulse. Alternatively, if the disconnection detected at the end of the S pulse is the result of dial impulses rather than due to the application of busy tone, then a loop condition will reappear before the K pulse is generated by the appropriate AND gate. This causes earth potential to be applied to the lead *y*, thereby resetting the bistable circuit BS34 to the condition where its A section transistor is conducting. In either of these two cases, the bias input applied to the pulse-plus-bias gate associated with the A section of the bistable circuit BS35 is negative when the K pulse commences. Under this condition, the bistable circuit BS35 does not turn over so that the output from the B section remains negative. This, together with the inverted K pulse, causes the AND gate GA81 to open and the resulting output on a lead *alm* is used for providing an alarm to indicate that the call has failed and that no busy tone has been returned to the calling incoming junction. The dummy register DREG is reset over the resetting lead. When the dummy register is reset, the multivibrator is arrested and the four bistable circuits BS32 to BS35 of the timing arrangement are restored to their normal condition. This is achieved by driving the emitters of the transistors of the B sections of the four bistable circuits negative by negative potential applied to the lead *a*.

What we claim is:

1. In an automatic telephone exchange system comprising incoming junction circuits, incoming junctions terminated on said incoming junction circuits, registers, and dial path means over which the registers can be connected selectively to incoming junction circuits, a scanning arrangement for scanning said incoming junctions comprising electronic scanning means operable during one part of each scan period for scanning a different one of said incoming junctions and responsive on detecting a calling condition on said junction to cause the seizure and coupling up of a free register to such calling incoming junction, said electronic scanning means being operable during another part of said scan period for scanning a group of said incoming junctions and responsive on detecting dial impulses on any calling incoming junction of said group, in respect of which calling incoming junction a register has already been taken into use, to cause such latter calling incoming junction to be connected over said dial path means to the appertaining register.

2. In an automatic telephone exchange system, a scanning arrangement as claimed in claim 1, in which the electronic scanning means comprises electronic counting means.

3. In an automatic telephone exchange system, a scanning arrangement as claimed in claim 2, in which the electronic counting means comprises a plurality of transistor bistable circuits interconnected for providing a total count to accommodate the total number of incoming junctions to be scanned.

4. In an automatic telephone exchange system, a scanning arrangement as claimed in claim 1, in which the electronic scanning means comprises two parts, one of which provides for the scanning of the incoming junctions of a group simultaneously while the other part of the scanning means serves, in combination with said one part, for scanning one of the incoming junctions of said group.

5. In an automatic telephone exchange system, a scanning arrangement as claimed in claim 4, in which the said one part of the electronic scanning means scans the said group of junctions by applying a scanning pulse in common to a plurality of gating circuits associated, respectively, with the incoming junctions of said group.

6. In an automatic telephone exchange system, a scanning arrangement as claimed in claim 5, in which the electronic scanning means comprises means effective during said one part of a scan period to extend to all of the registers in common a marking identifying to the registers a particular calling incoming junction which is being scanned by the scanning means, and in which the registers comprise comparator means for comparing the junction with incoming junction identities already stored within registers taken into use for dealing with incoming calls.

7. In an automatic telephone exchange system, a scanning arrangement as claimed in claim 6, in which, as a consequence of the comparator means determining that the identity of the calling incoming junction being scanned is not already stored in the engaged registers, a free register already selected by a register allotter is seized for dealing with the incoming call on the calling incoming junction and the identity of said junction is stored in incoming junction identity stores of the particular register taken into use.

8. In an automatic telephone exchange system, a scanning arrangement as claimed in claim 7, in which the electronic scanning means comprises a plurality of interconnected transistor bistable circuits and the incoming junction identity stores of the registers also comprise transistor bistable circuits, and in which the comparator means comprise pulse-plus-bias gating circuits associated with corresponding bistable circuits in the electronic scanner counter and the incoming junction identity stores of a register.

9. In an automatic telephone exchange system, a scanning arrangement as claimed in claim 1, in which the electronic scanning means comprises a two-part counter, in which means are provided for overriding that part of said counter which otherwise serves for selecting one junction from the group of junctions selected by the other part of the scanner counter.

10. In an automatic telephone exchange system, a scanning arrangement as claimed in claim 9, in which the dial path means comprises a plurality of pulse highways equal in number to the incoming junctions constituting each group and such highways being connected to corresponding junctions in each group of incoming junctions which extend from the electronic scanning means to all of the registers in common, and in which said highways are opened by gating circuits capable of being opened individually under the control of the appropriate part of the scanner counter for the purpose of scanning an individual incoming junction of the group selected by the other part of the scanner counter and adapted to be opened in common for the purpose of scanning the entire group of incoming junctions by operation of the overriding means as aforesaid whereby any register having stored therein the identity of any incoming junction being scanned by the electronic scanning means will respond to dial impulses detected on the pulse highway corresponding to the particular incoming junction for which the register has been taken into use.

11. In an automatic telephone exchange system, a scanning arrangement as claimed in claim 1, comprising timing and sequence control means which control operation of the electronic scanning means and control the total scan period as well as the sequencing and duration of the respective parts of said scan period.

12. In an automatic telephone exchange system, a scanning arrangement as claimed in claim 11, in which the timing and sequence control means form part of the electronic scanning means.

13. In an automatic telephone exchange system, a scanning arrangement as claimed in claim 1, in which the exchange includes at least one dummy register which is arranged to be seized by incoming calls initiated on incoming junctions when all of the other registers have been taken into use, and said dummy registers serve for preventing call failure by causing the extension of busy tone back over calling junctions to indicate that all of the normal registers are busy.

14. In an automatic telephone exchange system, a scanning arrangement as claimed in claim 13, in which the incoming junction identity stored within any of the registers is encoded in suitable form for transmission to a translator to provide a translation of the identity of the calling incoming junction for routing the call through the exchange when a translator couples itself to the register.

15. In an automatic telephone exchange system, a scanning arrangement as claimed in claim 14, in which the register applies to a translator coupler in order to pass the information stored in it to the translator and receives back a signal from the translator coupler to enable said register to pass such information to the translator.

16. In an automatic telephone exchange system, a scanning arrangement as claimed in claim 13, in which the dummy register includes a timing arrangement which enables the dummy register when taken into use to be released if busy tone has not been fed back over the calling junction for which the dummy register has been taken into use within a predetermined period.

References Cited

UNITED STATES PATENTS

| | | | |
|---|---|---|---|
| 3,106,615 | 10/1963 | Spellnes | 179—18.7 |
| 3,170,041 | 2/1965 | Spellnes | 179—18.21 |

KATHLEEN H. CLAFFY, *Primary Examiner.*

L. WRIGHT, *Assistant Examiner.*